United States Patent [19]

Tomohisa et al.

[11] Patent Number: 4,712,141

[45] Date of Patent: Dec. 8, 1987

[54] METHOD AND APPARATUS FOR INTERPOLATING IMAGE SIGNALS

[75] Inventors: Kunio Tomohisa; Masamichi Cho; Yasuo Kurusu, all of Kyoto, Japan

[73] Assignee: Dainippon Screen Mfg. Co., Ltd., Kyoto, Japan

[21] Appl. No.: 841,466

[22] Filed: Mar. 20, 1986

[30] Foreign Application Priority Data

Mar. 30, 1985 [JP] Japan ................................. 60-67865
Mar. 30, 1985 [JP] Japan ................................. 60-67867

[51] Int. Cl.$^4$ ............................................ H04N 1/40
[52] U.S. Cl. .................................. 358/280; 358/80; 358/283; 358/287
[58] Field of Search .................. 358/280, 283, 80, 78, 358/287

[56] References Cited

U.S. PATENT DOCUMENTS 4,506,301 3/1985 Kingley et al. ..................... 358/283

Primary Examiner—Edward L. Coles, Sr.
Attorney, Agent, or Firm—Lowe, Price, LeBlanc, Becker & Shur

[57] ABSTRACT

Image signals inputted from an input device are subjected to A-D conversion through an A-D converter to be stored in memory by at least an adjacent pair of pixels. The pair of pixels are interpolated by interpolation arithmetic circuit so that generated interpolation data and data on the pair of pixels are ordered under control by a timing controller to be outputted.

13 Claims, 20 Drawing Figures

FIG. 7
(a) ORIGINAL
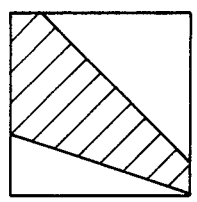
MAIN SCANING SAMPLING POINTS
VERTICAL SCANNING SAMPLING POINTS
(b) RELATED TECHNICAL EXAMPLE
(250%)
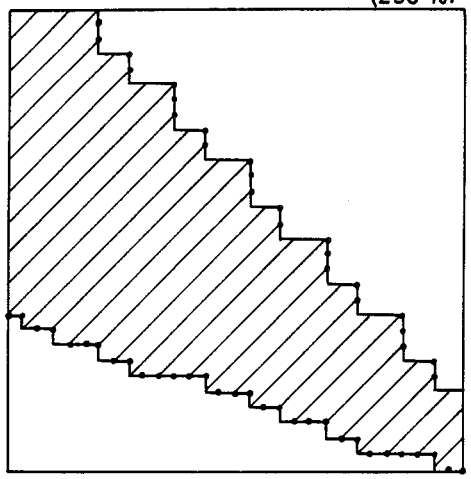
(c) INVENTION
(250%)
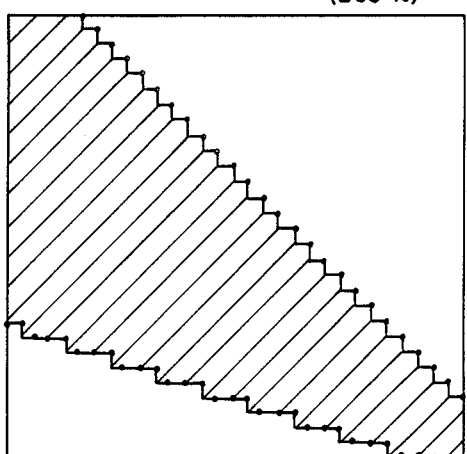

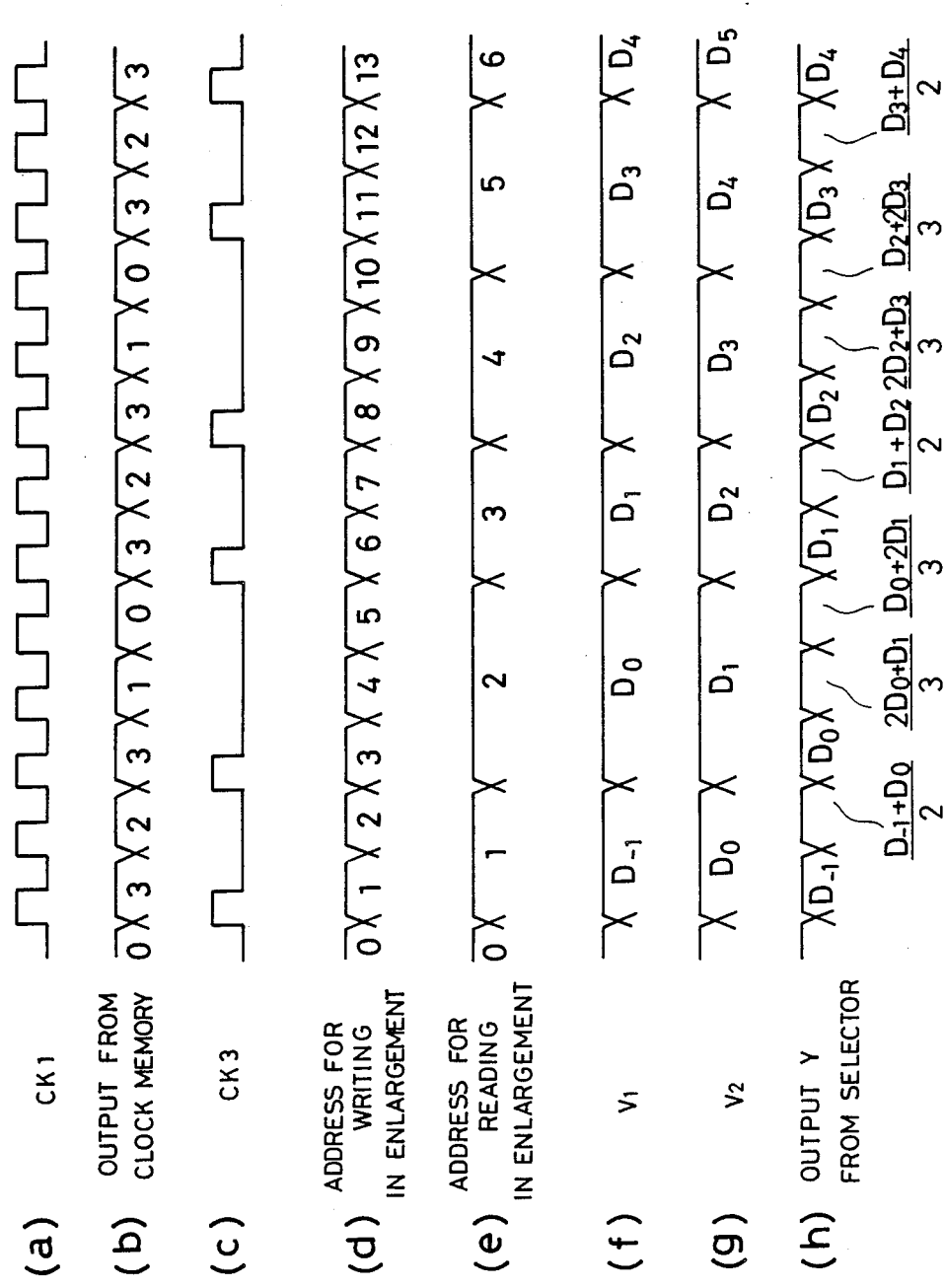

FIG.17
(a)
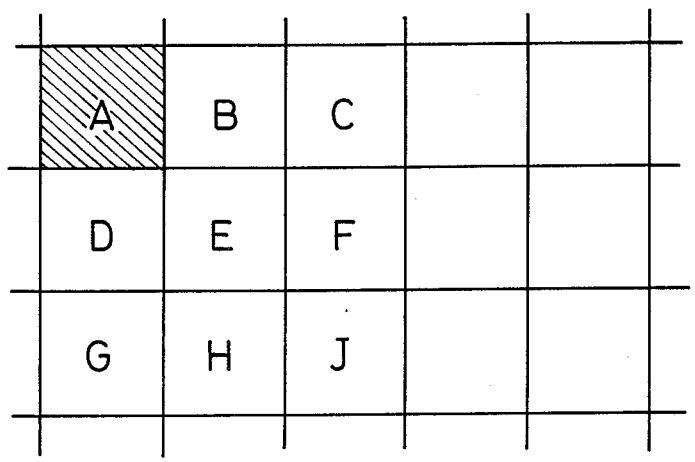
(b)
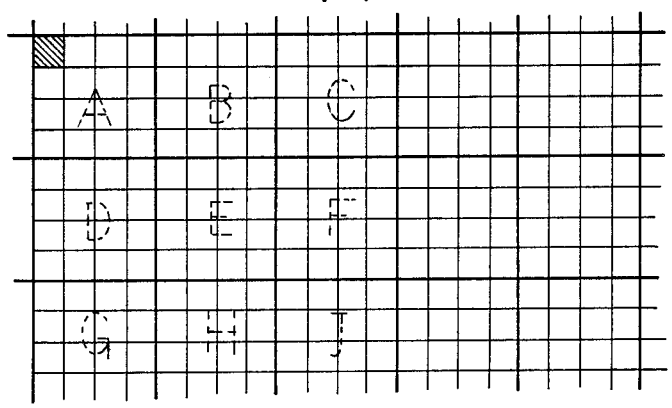

| A | $\frac{3A+B}{4}$ | $\frac{2A+2B}{4}$ | $\frac{A+3B}{4}$ | B | $\frac{3B+C}{4}$ | $\frac{2B+2C}{4}$ |
|---|---|---|---|---|---|---|
| $\frac{3A+D}{4}$ | $\frac{9A+3B+3D+E}{16}$ | $\frac{3A+3B+D+E}{8}$ | $\frac{3A+9B+D+3E}{16}$ | $\frac{3B+E}{4}$ | $\frac{9B+3C+3E+F}{16}$ | $\frac{3B+3C+E+F}{8}$ |
| $\frac{2A+2D}{4}$ | $\frac{3A+B+3D+E}{8}$ | $\frac{A+B+D+E}{4}$ | $\frac{A+3B+D+3E}{8}$ | $\frac{2B+2E}{4}$ | $\frac{3B+C+3E+F}{8}$ | $\frac{B+C+E+F}{4}$ |
| $\frac{A+3D}{4}$ | $\frac{3A+B+9D+3E}{16}$ | $\frac{A+B+3D+3E}{8}$ | $\frac{A+3B+3D+9E}{16}$ | $\frac{B+3E}{4}$ | $\frac{3B+C+9E+3F}{16}$ | $\frac{B+C+3E+3F}{8}$ |
| D | $\frac{3D+E}{4}$ | $\frac{2D+2E}{4}$ | $\frac{D+3E}{4}$ | E | $\frac{3E+F}{4}$ | $\frac{2E+2F}{4}$ |
| $\frac{3D+G}{4}$ | $\frac{9D+3E+3G+H}{16}$ | $\frac{3D+3E+G+H}{8}$ | $\frac{3D+9E+G+3H}{16}$ | $\frac{3E+H}{4}$ | $\frac{9E+3F+3H+J}{16}$ | $\frac{3E+3F+H+J}{8}$ |

FIG.18
(a)
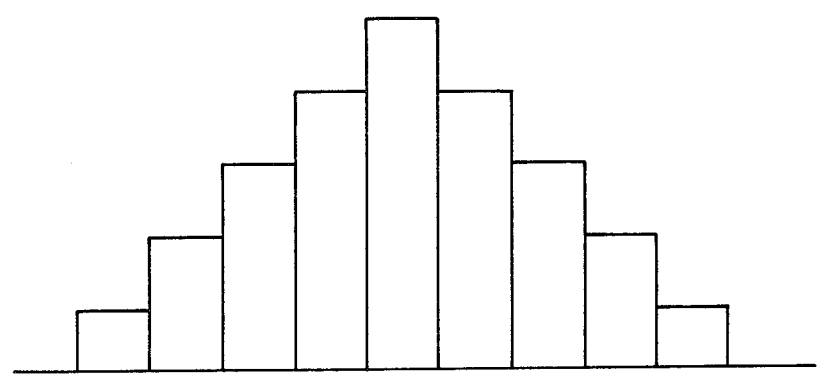
(b)
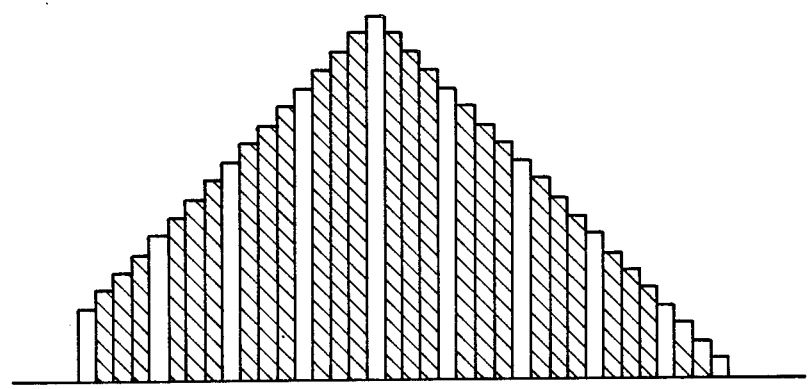

METHOD AND APPARATUS FOR INTERPOLATING IMAGE SIGNALS

BACKGROUND OF THE INVENTION

1. Field of the Invention

The present invention relates to a method and an apparatus for interpolating image signals, and more particularly, it relates to a method and an apparatus for interpolating image signals in processing of input and output images which are different in number of pixels.

2. Description of the Prior Art

In order to, for example, enlarge or reduce images, it is necessary to output the images in a different number of pixels from that of input images. Generally well known is technique of varying magnifications of images for an image processing device such as a process scanner, a laser printer, a facsimile or the like which temporarily stores image data in a memory having storage capacity for, e.g., one scanning line while relatively varying pixel clocks (or memory addresses) for writing and reading the image data in and from the memory with target magnifications thereby to increase or decrease the number of pixels. Examples of such technique are as follows:

A first system employs a frequency divinding circuit included in a PLL circuit, the frequencey dividing ratio of whech is varied to change pixel clock frequencies in writing and reading operations as disclosed in, e.g., Japanese Patent Publication Gazette No. 50561/1977. Although such a method substantially has no problem in a low frequency range, the PLL circuit is complicated in stucture and a high-speed processing circuit (device) is required in order to obtain outputs of a highly enlarged magnification value in an apparatus requiring processing in a high frequencey range, whereby the cost is inevitably increased.

In a second system, pixel clocks are employed in such a manner that additional pulses are inserted between ordinary periodic peixel clocks, i.e., synchronous pulse trains, as disclosed in, e.g., Japanese Patent Laying-Open Gazette No. 11601/1978. Such pixel clocks are adapted to designate addresses for writing in a memory while the original pixel clocks are adapted to designate addresses for reading from the memory, whereby reproduced pixels in the pattern of an original are increased in number in comparision with the pixels read or sampled from the original to provide enlarged image outputs. On the other hand, the pixel clocks may be adapted to designate the addresses for reading, thereby to obtain reduced image outputs. In such a system, however, the additional pulses must be inserted between the pulse trains in predetermined periods, whereby designation of magnifications for varying the same is restricted to, e.g., a range of 50 to 200% in the embodiment as disclosed in the Japanese Patent Laying-Open Gazette No. 11601/1978. Further, the magnification settable intervals are restricted to $(n+1)/n \times 100\%$ (n: integer), i.e., 1/2, 2/3, ... 1, ... 3/2 and 2/1.

A third system writes image data in a memory at a constant frequency (pexel clock) or sampling pitch to access the same with memory addresses being partially defaulted for reduction or duplicated for enlargement, thereby to decrease or increase the number of outputted pixels, as disclosed in, e.g., Japanese Patent Laying-Open Gazettes Nos. 65601/1979 and 35613/1979. According to such technique, distribution of the defaulted or duplicated addresses is averaged to considerably reduce unevenness of outputted images in reduction or enlargement, whereas the circuit structure for such averaging is complicated. Such a tendency is spurred by increase in the range of magnifications.

In the conventional magnification varying systems, thus, it has been difficult to obtain images in which additional pixels are evenly distributed in a wide magnification range with relatively simple circuit structure.

Further, the output operation is performed only through the pixel data written in the memory in each of the aforementioned systems, and hence continuous pixels in specific gradation are unexpectedly followed by those in different gradation when identical pixel data are repeated in a reproduced image in enlargement, whereby space gradation in the reproduced image cannot be smoothly changed.

In addition to the aforementioned case of enlargement and reduction, it is also necessary to output an image in a different number of pixels from that of the input image in order to obtain, e.g., an output image in resolution higher than that of the input image as hereinafter described.

In case where one-dimensional photoelectric conversion element array device such as a CCD line sensor, a CPD line sensor or a MOS-type line sensor is applied to, e.g., a process scanner which requires high output resolution, the upper limit of input resolution depends on the form and characteristics specific to the one-dimensional photoelectric conversion element array device as employed. In other words, the one-dimensional photoelectric conversion element array device is formed by a number of linearly arrayed photoelectric conversion elements having prescribed areas so that main scanning is performed along the direction of the array, and hence the input resolution in the main scanning direction is determined by the number of the photolectric conversion elements. In order to improve the input resolution in the main scanning direction, therefore, it is necessary to increase the number of the photoelectric conversion elements included in the one-dimensional photoelectric conversion element array device, whereas such increase is restricted as for a device.

On the other hand, input resolution in the vertical scanning direction is determined by the form, the charge storage time and the vertical scanning speed of, e.g., a storage type of such a device. Therefore, the input resolution in the vertical direction can be improved without changing the form of the device by increasing the amount of incident light to reduce the storage time, whereas intense illumination is required to cause other problems such as heat generation in an illumination system. Even if the storage time can be reduced by intensifying the illumination for an original, the signal charges thus obtained and read at a high speed within the said storage time cannot be followed by the conversion speed of an A-D converter in a subsequent stage in wide gradation (e.g., 12 bits) required for process and, therefore, required is processing such as parallel processing through a plurality of costly A-D converters, leading to a complicated processing circuit with increase in cost.

Also proposed is a method of forming a process scanner of high resolution by arraying a plurality of one-dimensional photoelectric conversion element array devices in a linear or zigzag manner, whereas, in such a method, registration of the one-dimensional photoelectric conversion element array devices and adjustment of optical systems are complicated while a circuit for processing image signals thus obtained is complicated with increase in cost.

Consequently, it is not advisable to improve input resolution to a level equivalent to output resolution in the case of an apparatus such as a process scanner which requires high output resolution. In consideration of characteristics of the one-dimensional photoelectric conversion element array device such as a CCD line sensor and an A-D converter employed therein, it is rather preferable to set the input resolution to be lower than the output resolution while compensating the difference between the same by increasing the number of pixels of the input image through appropriate image processing thereby to obtain an effect substantially equivalent to that in the case of high input resolution. Also in this case, it is preferable that gradation of the output image is not abruptly changed, similarly to the aforementioned case of enlargement, to obtain an output image of smooth picture quality.

SUMMARY OF THE INVENTION

An apparatus for interpolating image signals according to the present invention comprises memory means for storing image data on at least two adjacent pixels of an input image, interpolation data generation means for interpolating between said two pixels to generate at least one interpolation data and timing control means for controlling output timings so that the image data on the two adjacent pixels and the generated interpolation data are outputted in a mode ordered in accordance with the array of pixels of an output image.

The memory means may be implemented by a memory provided in an image processing unit which receives image data to store the same in the memory thereby to output the image data at a designated magnification value, and in this case, the aforementioned interpolation data is employed as pixel data to be dilated for enlargement particularly in case of enlargement processing.

Further, the memory means may be implemented by a register for storing image data obtained by A-D conversion of output signals from a one-dimensional photoelectric conversion element array device such as a CCD line sensor by a pair of pixels adjacent in the main scanning direction and/or a line memory for storing the image data for a pair of scanning lines adjacent in the vertical scanning direction, and obtained in this case is output resolution higher than the input resolution of the one-dimensional photoelectric conversion element array device.

Accordingly, the principal object of the present invention is to provide a method and an apparatus for interpolating image signals, which method and apparatus can readily obtain an output image of smooth picture quality with simple structure when input pixels are different in number from output pixels, particularly when the output pixels are larger in number than the input pixels.

A second object of the present invention is to provide a method and an apparatus for interpolating image signals, which method and apparatus can obtain output image data with additional pixels evenly distributed in a wide magnification varying range from input image data picked up at constant sampling pitches regardless of magnification values as well as a natural image with space gradation smoothly changed in a reproduced image in enlargement processing.

A third object of the present invention is to provide method and an apparatus for interpolating image signals, which method and apparatus can form a scanner of high resolution, by using a one-dimensional photoelectric conversion element array device with a relatively small number of elements or pixels, in simple structure at a low cost.

These and other objects, features, aspects and advantages of the present invention will become more apparent from the following detailed description of the invention when taken in conjunction with the accompanying drawings.

BRIEF DESCRIPTION OF THE DRAWINGS

FIGS. 6 and 7 illustrate image data in enlargement processing;

FIG. 11 is a timing chart showing the operation of the first embodiment as shown in FIG. 8;

FIG. 17 is a typical diagram showing input/output image signals;

FIG. 18 illustrates examples of image signals before and after interpolation.

DETAILED DESCRIPTION OF THE PREFERRED EMBODIMENTS (A) Entire Structure of First Embodiment Description is now made on a first embodiment, in which interpolation processing according to the present invention is applied to image enlargement in an image processing apparatus which receives image data to store the same in memory means thereby to output the image data at a designated magnification value.

Figure 1:
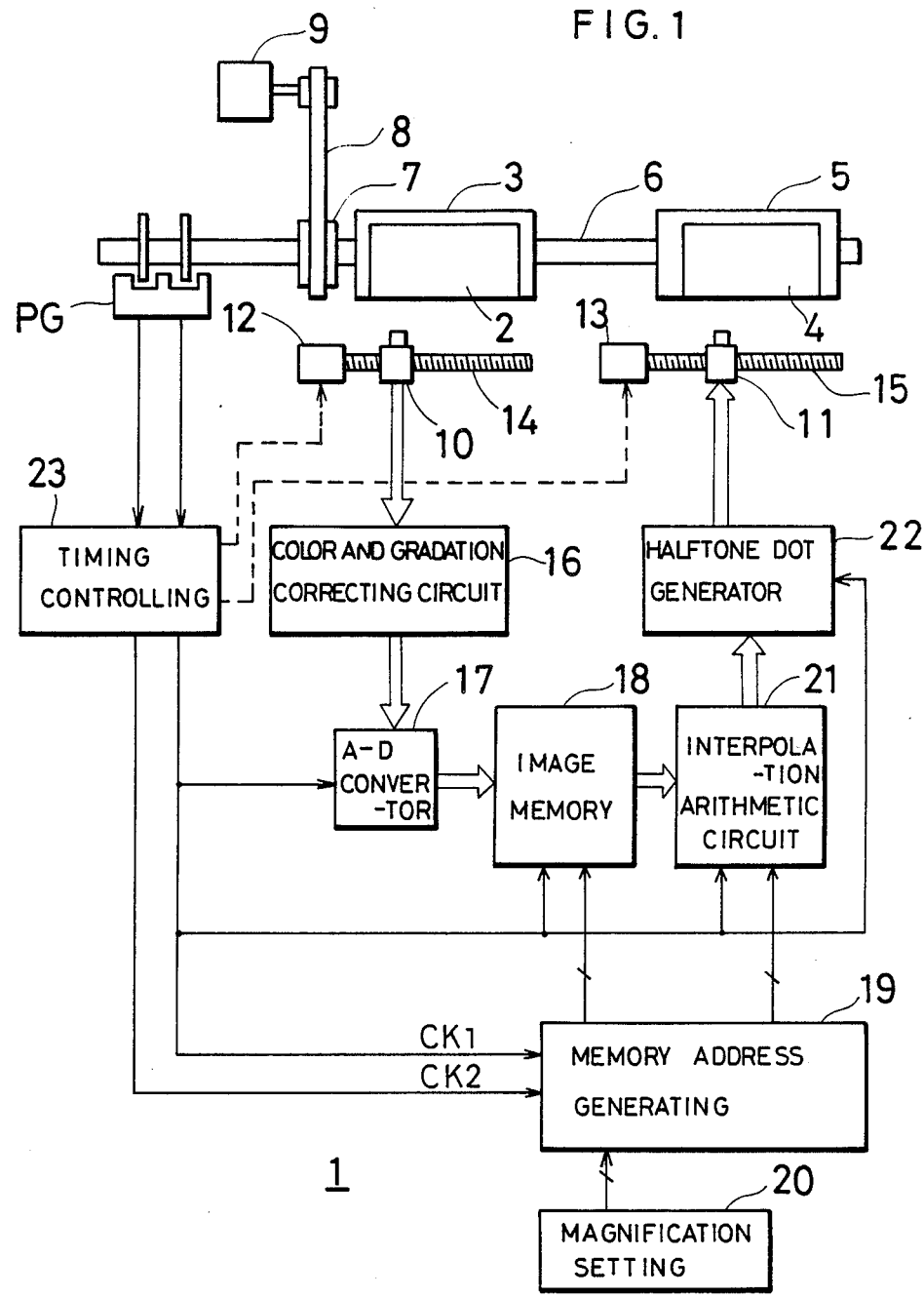
FIG. 1 is a schematic diagram showing a first embodiment of the present invention.

FIG. 1 is a schematic diagram showing the first embodiment which is applied to a drum scanning type process color scanner 1, while the present invention is not restricted to such application, but is applicable also to a drum scanning type monochrome scanner, a flat bed scanning type process scanner and the like. In FIG. 1, arrows in double lines denote image signals and arrows in solid lines denote control pulses while those in dot lines denote control signals for a vertical scanning driving motor respectively.

The color scanner 1 as shown in FIG. 1 is provided with an original drum 3 around which an original 2 is wound and recording drum 5 around which a photosensitive material 4 is wound. Both of the original and recording drums 3 and 5 are fixed to a drum shft 6, which is synchronously rotated by driving force supplied from a motor 9 through a pulley 7 and a belt 8. In an opposite manner to the original drum 3 and the recording drum 5, a pickup head 10 and an exposure head 11 are arranged to be movable in parallel with the drum shft 6, to be fed by feed screws 14 and 15 through driving force supplied from driving pulse motors 12 and 13 respectively.

The pickup head 10 contains a color separation optical system and a plurality of photoelectric conversion elements etc. to read color tones and optical density of the original 2 thereby to generate color-separated image signals in the three primary colors. The color-separated image signals are subjected to arithmetic processing in a color and gradation correcting circuit 16 for correction of the color tones and gradtion, to be converted to image signals for recording. The converted signals are supplied to an A-D converter 17, which in turn samples the said signals in response to periodic pixel clocks CK1 from a timing control part 23 as hereinafter described, thereby to sequentially perform A-D conversion of the same. The image signals thus A-D converted are supplied to an image memory 18.

In the apparatus according to the present invention, a desired reproduced image magnification value is previously designated in a magnification setting part 20, which can be formed by a CPU or combination of digital switches and a decoder. The image data are written in the image memory 18 in such a manner that a memory address generation part 19 generates address signals in response to the signals from the magnification setting part 20 in such modes as herein-after described to write the image data in addresses of the image memory 18. In a similar manner, the image data are read from the addresses of the image memory 18 designated by outputs from the memory address generation part 19, to be supplied to an interpolation arithmetic circuit 21 in a subsequent stage. The interpolation arithmetic circuit 21 is adapted to interpolate the read pixels in a mode as hereinafter described when the magnication is designated in an enlarged size, while supplying the said outputs to a halftone dot generator 22 with no such interpolation when the magnification is designated in an equal or reduced size. The halftone dot generator 22 compares the received image signals and reference halftone dot signals to generate halftone dot outputs, thereby to record or reproduce the image on the photosensitive material 4 through the exposure head 11.

In synchronization with input pulses from a pulse generator PG which is synchronous with rotation of the drum shaft 6, the timing control part 23 generates the pixel clocks CK1, main scanning periodic clocks CK2 indicating initiation or completion of one main scanning operation and the control signals for the driving pulse motors 12 and 13, to supply the same to the respective parts as shown in FIG. 1. The remaining mechanical structure and the like are identical to those of a well-known facsimile etc. and deailed deacription thereof is omitted.

(B) Related Technical Example

In order to facilitate understanding of present invention, description is now made on a technical example which closely related to the present invention. This technical example (not yet published) has been proposed by the inventor, to attain the aforementioned principal object of the present invention.

(B-1) Structure of Related Technical Example

Figure 2:
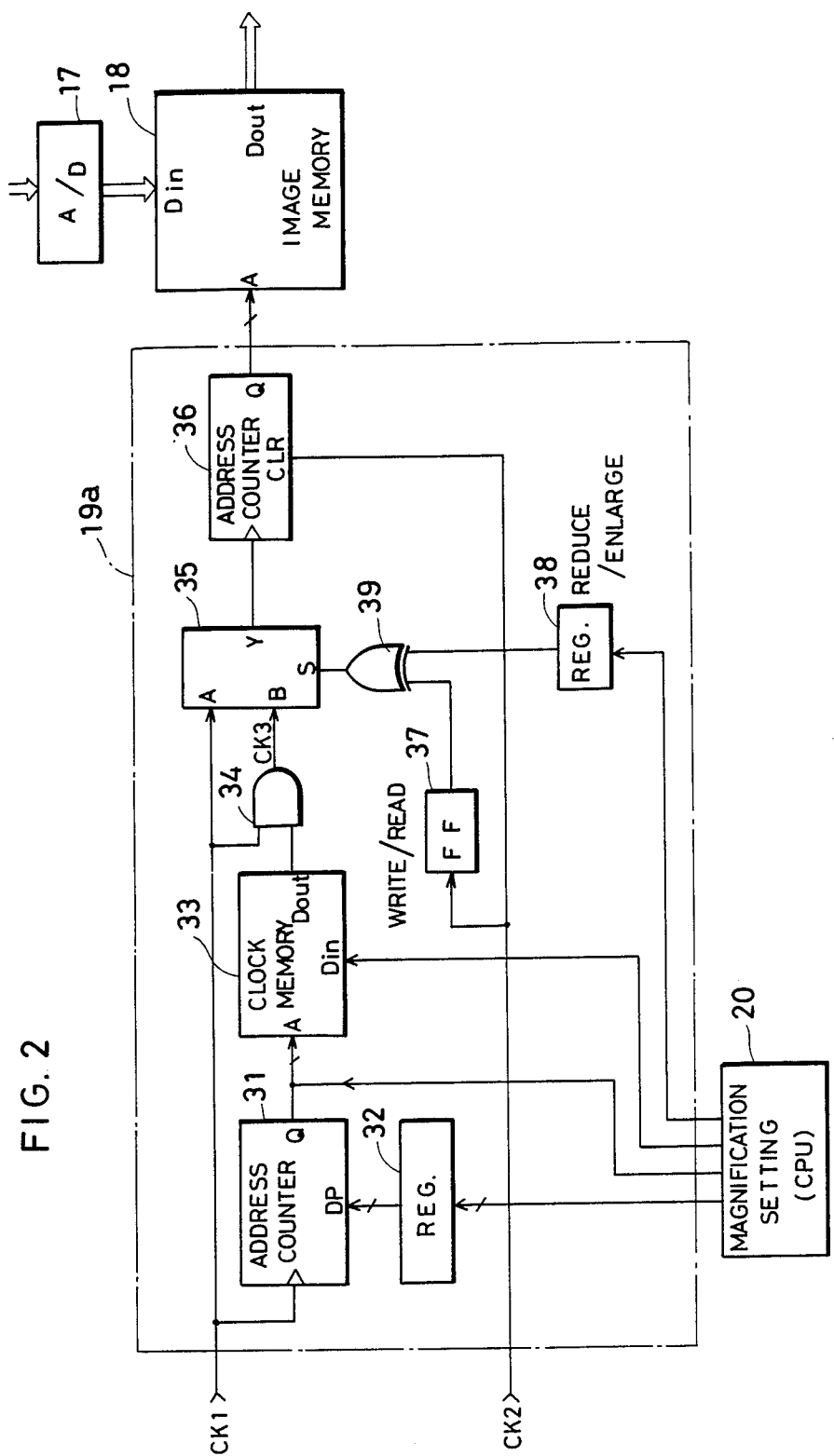
FIG. 2 is a detailed illustration of a technical example related to the first embodiment.

The technical example is mainly different from the first embodiment of the present invention as shown in FIG. 1 in that no interpolation circuit 21 is provided and that memory address generation part 19 is in different structure. FIG. 2 is a block diagram showing memory address generation part 19a of the technical example in detail, while other components are shown in numerals identical to those in FIG. 1. The memory address generation part 19a as shown in FIG. 2 includes an address counter (programmable n-ary counter) 31 for receiving pixel clocks CK1 supplied from the timing control part 23 as shown in FIG. 1. The address counter 31 is previously supplied with a prescribed load value through a register 32 from a magnification setting part 20 which is formed by a CPU. Assuming that the magnification is set at n/m (n, m: integers), such a prescribed load value can be set in a number (m−1) when the address counter 31 is a down counter, or in a number ($2^k$−m) when the address counter 31 is an up counter, k being the bit number of the address counter 31. Thus, the address counter 31 provides cyclic address outputs which return to the original address every time the pixel clock CK1 generates m pulses.

The count outputs from the address counter 31 are supplied as address inputs to a clock memory 33. The clock memory 33 previously stores data of m words × 1 bit which are determined following a prescribed rule corresponding to the magnification as hreinafter described and are supplied from the magnification setting part 20, so that the data are read out word by word from accessed addresses to be supplied to an AND circuit 34. The AND circuit 34 gates the pixel clocks CKI by the outputs from the clock memory 33 thereby to generate clocks (second clocks) CK3 obtained by regularly defaulting clock pulses from the clock pulse array of pixel clocks CK1.

A selector 35 in a subsequent stage receives the pixel clocks CK1 and the second clocks CK3 to supply either the former or the latter to an address counter 36. Such selection is performed by outputs from an XOR circuit 39 which receives outputs from a flip-flop 37 for selecting writing and reading and outputs from a register 38 for selecting reduction and enlargement. The selector 35 selects the clocks CK3 for reading the image data from the image memory 18 in enlargement and for writing the same thereinto in reduction and the pixel clocks CK1 in other case. In other words, data on the input terminal A of the selector 35 is selected in case of S=1 while data on the input terminal B is selected in case of S=2 in FIG. 2 respectively. The flip-flop 37 receives main scanning periodic clocks CK2 while the register 38 receives inputs from the magnfication setting part 20.

The address counter 36 receives the clocks thus selected and counts the same to supply its address outputs to the image memory 18, which in turn writes or reads the image data in correspondence to the address outputs from the address counter 36.

(B-2) Storage Contents of Clock Memory 33

Description is now made on data contents to be stored in the clock memory 33. The magnification setting part 20 operates the clock pulses to be defaulted from those of the pixel clocks CK1 in response to the set magnification value as hereinafter described, so that the results of the operation are srored in the clock memory 33. In this technical example, the AND circuit 34 obtains logical products of the pixel clocks CK1 and the outputs from the clock memory 33 to default (m−n) clock pulses from m clock pulses, thereby to produce the clocks CK3. Therefore, it is required for the data to be stored in the clock memory 33 that (m−n) pulses in the interval for m pulses of the pixel clocks CK1 become "0" and the remaining n pulses become "1", and the n pulses of "1" are preferably distributed as averagely as possible.

Figure 3:
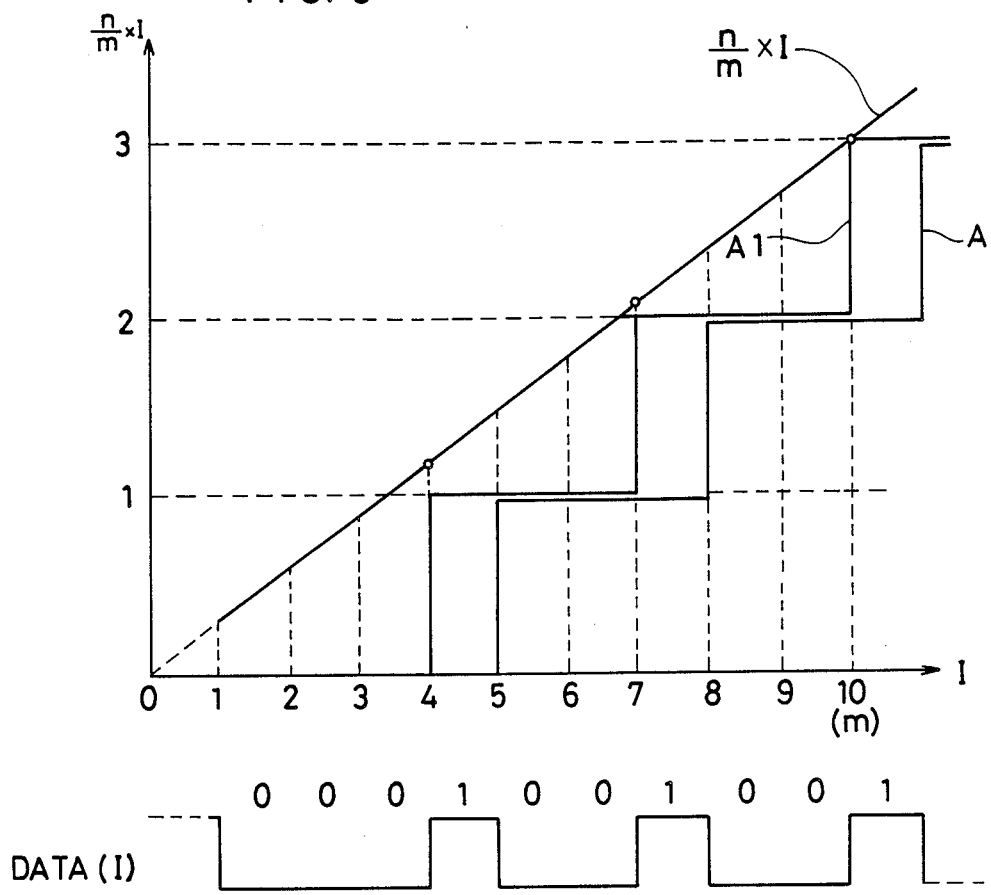
FIG. 3 is a diagram showing the principle of producing data in a clock memory of the related technical example.

In the technical example, therefore, a plurality of continuous words are sequentially collected to multiply the number of the words by (n/m) to assign "1" to the last word of every value exceeding one word thereby to obtain average distribution. Such an idea is illustrated in FIG. 3. The abscissa in FIG. 3 shows bit order (I=1, 2, ..., m) of the data or the addresses in the clock memory 33 and the ordinate shows (n/m)×I in case of reduction at a ratio of 30% (n=3, m=10). As shown in FIG. 3, the value (n/m)×I is linearly increased with respect to I, to exceed the integers 1, 2 and 3 in the ordinate in positions where the value I reaches 4, 7 and 10 as shown by small white circles. Thus, when the value I is sequentially increased in consideration of a set of first to I-th words in this example, words which may become "1" newly appear respectively in points where I is equal to 4, 7 and 10, and hence the word DATA (I) corresponding to the said I values are set at "1".

With respect to the whole data from I=1 to I=m (10 in the shown example), n bits within the m bits are strictly "1" as obvious from the fact that the values (n/m)×I become n at I=m. In other words, the average distribution can be obtained in approximation of extremely high accuracy while strictly maintaining the designated magnification value.

Figure 4:
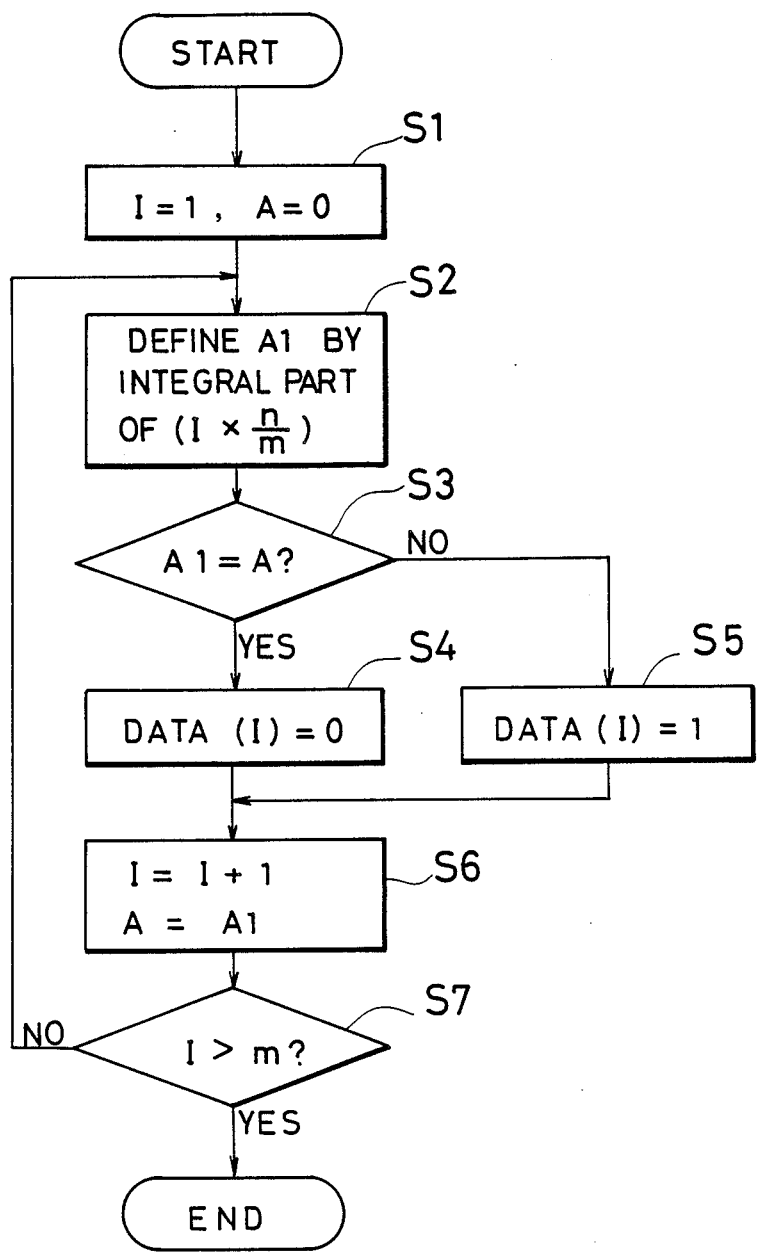
FIG. 4 is a flow chart showing data producing processing in the clock memory of the related technical example.

FIG. 4 is a flow chart illustrating procedure of producing the data to be stored in the clock memory 44 by the magnification setting part 20 in accordance to the said rule. The flow chart as shown in FIG. 4 is now described, also with reference to FIG. 3 illustrating relation between amounts "A" and "A1" in FIG. 4 and the value I.

At a step S1, the value I is set as 1 and the amount A is set at zero, and at a subsequent step S2, the integral part of (n/m)×I is operated to be assigned to A1. Then, at a step S3, a determination is made on correspodence between A1 and A. For example, when I=1 in the example as shown in FIG. 3, A1=A=0. and hence the process is advanced to a step S4, at which data DATA(I) to be assigned to an I-th word is set at "0". Then, at a step S6, the value I is increased by 1 and the value A is redefined by the current value A1, and the process is advanced to a step S7. When the value I is smaller than m, the process is returned to the step S2. Such operation is repeated on I=1, 2 and 3 respectively in the example as shown in FIG. 3, while it is assumed here that the value I becomes 4 thereafter. Then, A1 becomes "1" at the step S2 (refer to A1 corresponding to I=4 in FIG. 3), and hence A1≠A at the step S3, wherby the process is advanced to the step S5 to set the data DATA(I) at "1". Then, the value A is set at A1 (=1) at the step S6. In a subsequent processing loop (I=5), A1=A (=1), and hence the data DATA(I) again becomes "0". The data DATA(I) for the respective values I are defined in such a manner, and the data production is completed with I>m.

As illustrated in FIG. 3, through the fact that A1 indicating the integral part of (n/m)×I and A following A1 in delay by 1 word are discrepant only in points where A1 is changed, the data DATA(I) is set at "1" with respect to the value I with the said discrepancy in the processing as shown in FIG. 4. It may be understood from FIG. 3 that such discrepance appears in the positions shown by the small white circles on the graph of (n/m)×I as shown in FIG. 3.

Table 1 shows the data to be stored in the clock memory 33 obtained on the basis of the aforementioned rule. For example, the column of the magnification at the ratio of 30% (m=10, n=3) shows the data as shown in the lower part of FIG. 3 (begins from "1" in Table 1, for convenience of illustration).

TABLE 1

| Magnification | Data in clock Memory | m | n |
|---|---|---|---|
| ... | ... | ... | ... |
| 20% | 10000<br>10000100001000010001<br>00001000010000100010 | 5 | 1 |
| 21% | 0001000010000100010001000100001000<br>01000010000100010000 | 100 | 21 |
| 30% | 1000100100 | 10 | 3 |
| 50% | 10 | 2 | 1 |
| 75% | 1110 | 4 | 3 |
| 99% | 1111111111111111111<br>1111111111111111111<br>1111111111111111111<br>1111111111111111111<br>1111111111111111110 | 100 | 99 |
| 100% | 1<br>1111111111111111111<br>1111111111111111111 | 1 | 1 |
| 101% | 1111111111111111111<br>1111111111111111111<br>1111111111111111111<br>0 | 101 | 100 |
| 125% | 11110 | 5 | 4 |
| 150% | 110 | 3 | 2 |
| 200% | 10 | 2 | 1 |
| 250% | 10100 | 5 | 2 |
| 300% | 100 | 3 | 1 |
| 500% | 10000 | 5 | 1 |
| ... | ... | ... | ... |

Although the above description has been made on the case of reduction, such reduction is only different from enlargement as to whether the clocks CK3 obtained on the basis of the data are employed for writng in the image memory 19 or reading from the same, and hence the same data contents may be employed in a corresponding manner. For such reason, the data on reduction at a ratio of n/m are identical to those on enlargement at a ratio of m/n in Table 1.

(B-3) Operation of Related Technical Example

Figure 5:
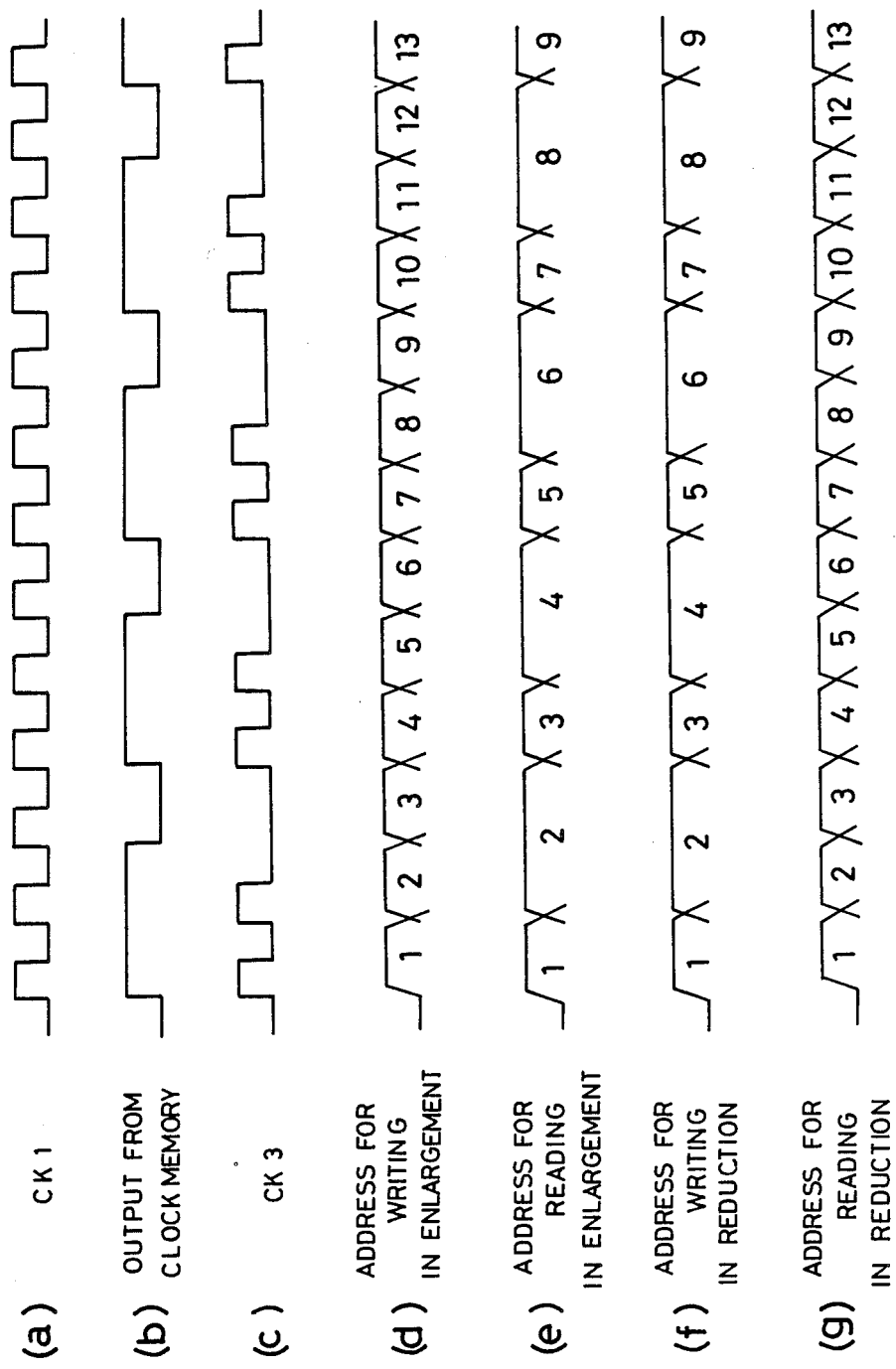
FIG. 5 is a timing chart showing the operation of the related technical example.

With reference to a timing chart shown in FIG. 5, the operation of this technical example will be described particularly on portions characterizing this example. In FIG. 5, the operation is performed on the values m=3 and n=2, i.e., enlargement at a ratio of 150% in magnification and reduction at a ratio of 66% in magnification.

Enlargement at 150%

Operation for enlargement at the ratio of 150% is now described. In advance to receiving an image, the magnification value (150%) is set by the magnification setting part 20. Then the magnification setting part 20 performs arithmetic to obgtain the data of m (=3) words×1 bit to be stored in the clock memory 33 in accordance with the flow chart as shown in FIG. 4, to store the same in the clock memory 33. The magnification setting part 20 simultaneously loads the value of m in the address counter 31 through the register 32 while supplying signals to the register 38 to place the same in a state indicating "enlargement".

Upon initiation of reading the original 2, the main scanning periodic clocks CK2 are supplied so that the flip-flop 37 enters a state indicating "writing" and the address counter 36 is cleared. Then, the pixel clopcks Ck1 from the timing contrpol part 23 (FIG. 1) are periodically supplied as shown at FIG. 5(a). The address counter 31 counts the pixel clocks CK1 to output address signals which are increased or decreased pulse by pulse and cycle per m pulses of the pixel clocks CK1. The clock memory 33 receives the outputs as address inputs, to sequentially read out the aforementioned data (see FIG. 5(b)) stored therein. The AND circuit 34 receives the data to gate the pixel clocks CK1 by the same thereby to generate the clocks CK3 obtained by regularly defaulting the pulses of the pixel clocks CK1, as shown at FIG. 5(c).

On the other hand, the output from the register 37 is "1" (writing) and the output from the register 38 is "0" (enlargement) at this time, and hence the XOR circuit 39 outputs "1". As hereinabove described, the selector 35 selects the A inputs with respect to S=1, and hence the address counter 36 receives the pixel clocks CK1 in this case. Thus, the address counter 36 generates address outputs (see FIG. 5(d)) corresponding to the periodic pixel clocks CK1 to supply the same to the image memory 18. Therefore, the image memory 18 stores all the original pixel data received in this apparatus with no omission for the writing operation.

Now considered is the reading operation for the enlargement, which is different from the aforementioned writing operation in the following points: The flip-flop 37 is placed in a "0" (reading) state by the main scanning periodic clocks CK2. Then the XOR circuit 39 outputs "0", whereby the B inputs, i.e., the clocks CK3 are selected by the selector 35. thus, the address counter 36 receives pulses in the form as shown at FIG. 5(c), to continuously access the same addresses in positions the pulses are defaulted from the clocks CK3, as shown at FIG. 5(e). In the operation for reading the image data from the image memory 18, a plurality of continuous pixels having the same contents are followed by subsequent pixels, thereby to reproduce the image in enlarged form.

Reduction at 66%

The operation for reduction is performed in an inverse manner to the above operation for enlargement. In other words, the register 38 indicates "1" (reduction) and hence the selector 35 selects the clocks CK3 for writing and the pixel clocks CK1 for reading respectively. Thus, address signals corresponding to the clocks CK3 are generated in writing as shown at FIG. 5(f), so that the image data are recorded along the main scanning direction on the original with the pixels reduced in processing. The image data are read by the pixel clocks CK1 in reading, thereby to provide a reduced reproduced image.

Thus, the clock pulses are so defaulted that the pixels are increased in enlargement and decreased in reduction.

(B-4) Advantages and Disadvantages of the Related Technical Example

According to the aforementioned technical example, the values n and m can be arbitrarily set to enable image processing in a wide variable range of magnifications with simple circuit structure. Further, unevenness of the reproduced image is reduced by the average distribution of the default pulses as hereinabove described. Thus, the technical example attains the principal object of the present invention.

Figure 6:
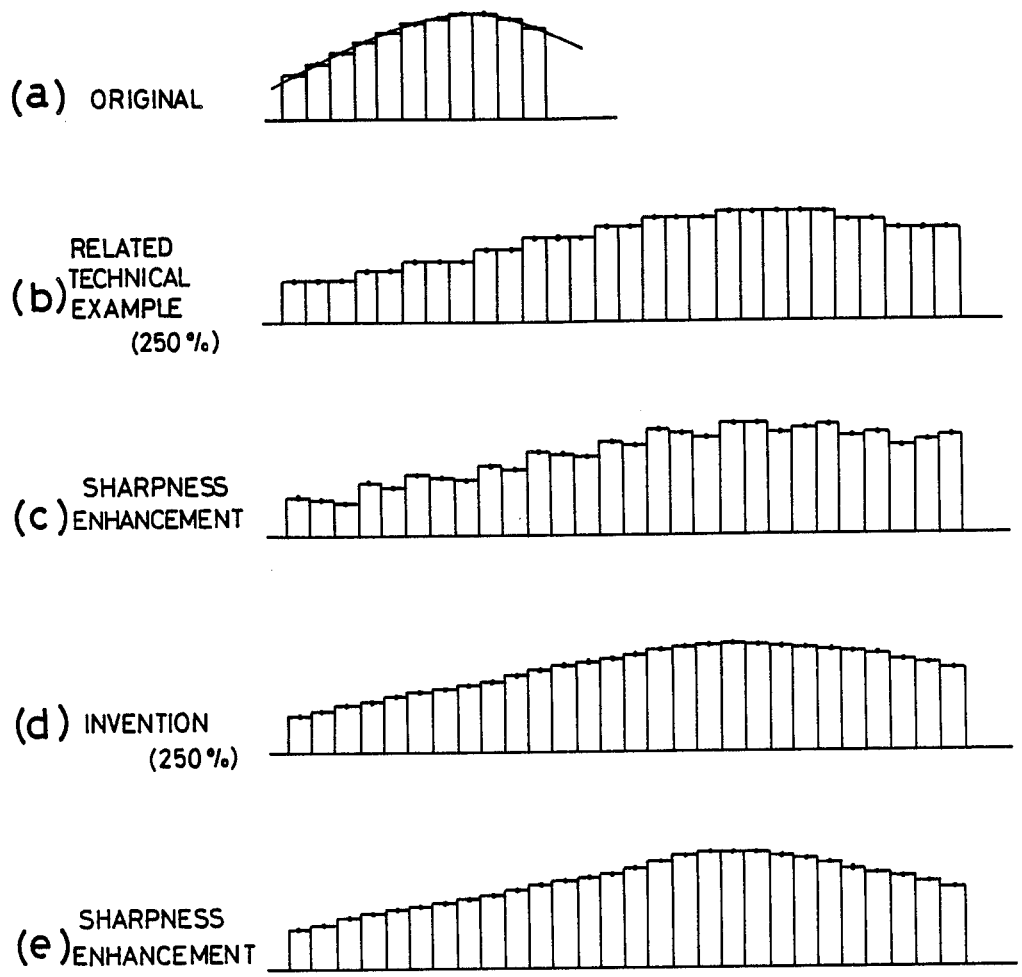

However, the increase in the pixel data causes problems in the reproduced image in enlargement. For example, image data as shown at FIG. 6(b) are obtained by applying the aforementioned enlargement (250%) to original data as shown at FIG. 6(a), whereas gradation changes are partially inverted as shown at FIG. 6(c) by application of processing for enhancing sharpness. Further, when the enlargement is performed on an original having gradation boundary lines slanted in directions defferent from both of main and vertical scanning directions as shown at FIG. 7(a), the reproduced gradation boundary lines are inevitably stepped as shown at FIG. 7(b).

(C) Details of Structure of First Embodiment

Figure 8:
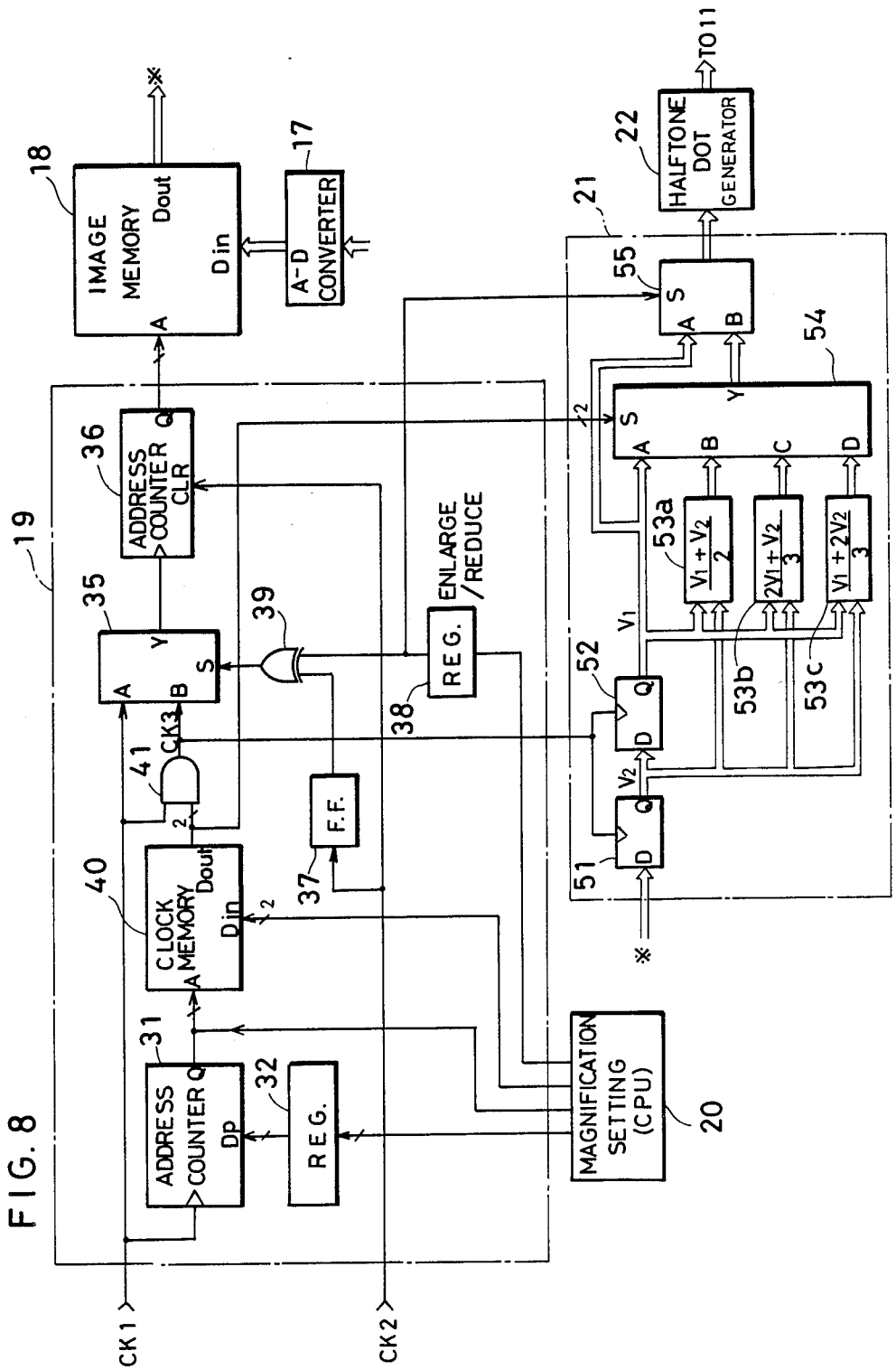
FIG. 8 is a detailed schematic diagram showing the first embodiment.

Accordingly, the present invention is so structured as to perform interpolation for enlargement in order to overcome the aforementioned problems, while employing the technical idea of the above related example. FIG. 8 is a block diagram showing the first embodiment as shown in FIG. 1 in detail, which is defferent from the technical example of FIG. 2 in the following points:

In comparison with the memory address generation part 19a of the technical example, the memory address generation part 19 of the first embodiment is characterized in that the clock memory 40 is with data inputs/outputs in two-bit structure, and storage contents thereof include new information as hereinafter described, that one input of the AND circuit 41 is in two-bit structure, and that the interpolation arithmetic circuit 21 receives the clocks CK3 and the outputs from the clock memory 40. On the other hand, the outputs from the image memory 18 are supplied to two D type flip-flops or D-FFs 51 and 52 which are connected in series with each other and included in the interpolation arithmetic circuit 21. The D-FFs 51 and 52 receive the clocks CK3 in latch inputs thereof. Respective outputs $V_1$ and $V_2$ from the D-FFs 51 and 52 are supplied to three linear interpolation circuits 53a to 53c. The linear interpolation circuits 53a to 53c receive the outputs $V_1$ and $V_2$ to operate three linear interpolation values as follows:

$$(V_1+V_2)/2 \qquad (1)$$

$$(2V_1+V_2)/3 \qquad (2)$$

$$(V_1+2V_2)/3 \qquad (3)$$

which are supplied as B to D inputs for a selector 54. The outputs $V_1$ (original pixel data) from the D-FF 52 are directly supplied as A inputs to the selector 54. One of the four inputs A to D are selected by the two bit outputs from the clock memory 40, to serve as Y outputs. This embodiment is so structured that the D, C, B and A inputs are respectively selected when the selecting inputs respectively indicate "0", "1", "2" and "3". Therefore, in this case, "3" indicates the original pixel data and "2" indicates signals in the expression (1) while "1" indicates signals in the expression (2) and "0" indicates signals in the expression (3). This is shown as "0" to "3" in Table 2 which is inserted few pages after. Further, the outputs from the selector 54 and the outputs $V_1$ from the D-FF 52 are received by a selector 55, which in turn selects the A inputs for reduction and the B inputs for enlargement respectively to supply the same to the halftone dot generator 22, with the reduction/enlargement indicating inputs supplied from the magnification setting part 20 through the register 38 as selection inputs.

(D) Storage Contents of Clock Memory 40 in First Embodiment

Description is now made on data contents to be stored in the clock memory 40. The data are supplied in the unit of one bit in the aforementioned case, while the same are in two-bit units this time, to include selection data for selecting interpolation data. In the first embodiment, clock pulses are regularly defaulted from the pixel clocks CK1 following the rule employed in the aforementioned related technical example while pixels newly added in correspondence to the default pulses are assigned with values obtained by interpolation of data on original pexels adjacent to the same. It is to be noted that the first embodiment is directed to enlargement up to 300%.

The interpolation values vary with positional relation between the said added pixels and the original pixels, to assign a value obtained by simply averaging two pixel data $V_1$ and $V_2$ (e.g., gradation data) on two original pixels with respect to an added pixel $P_0$ when the said pixel $P_0$ is between the said two original pixels, and values obtained by weightedly averaging in the ratio of 1:2 and 2:1, when two continuous added pixels $P_1$ and $P_2$ are inserted between two original pixels, the two pixel data $V_1$ and $V_2$ on the two original pixels with respect to the added pixels $P_1$ and $P_2$ respectively. Such interpolation is called as linear interpolation.

Therefore, it is necessary to find the added pixels in the outputs from the image memory 18 and find positional relation between the said added pixels and the original pixels. In the first embodiment according to the present invention, the former ionformation is indicated by using similar data to that in Table 1 for indicating the pulse default rule employed in the aforementioned technical example while the latter positional relation is indicated by assigning one of three values as hereinafter described to words indicating default in the data.

Figure 10A:
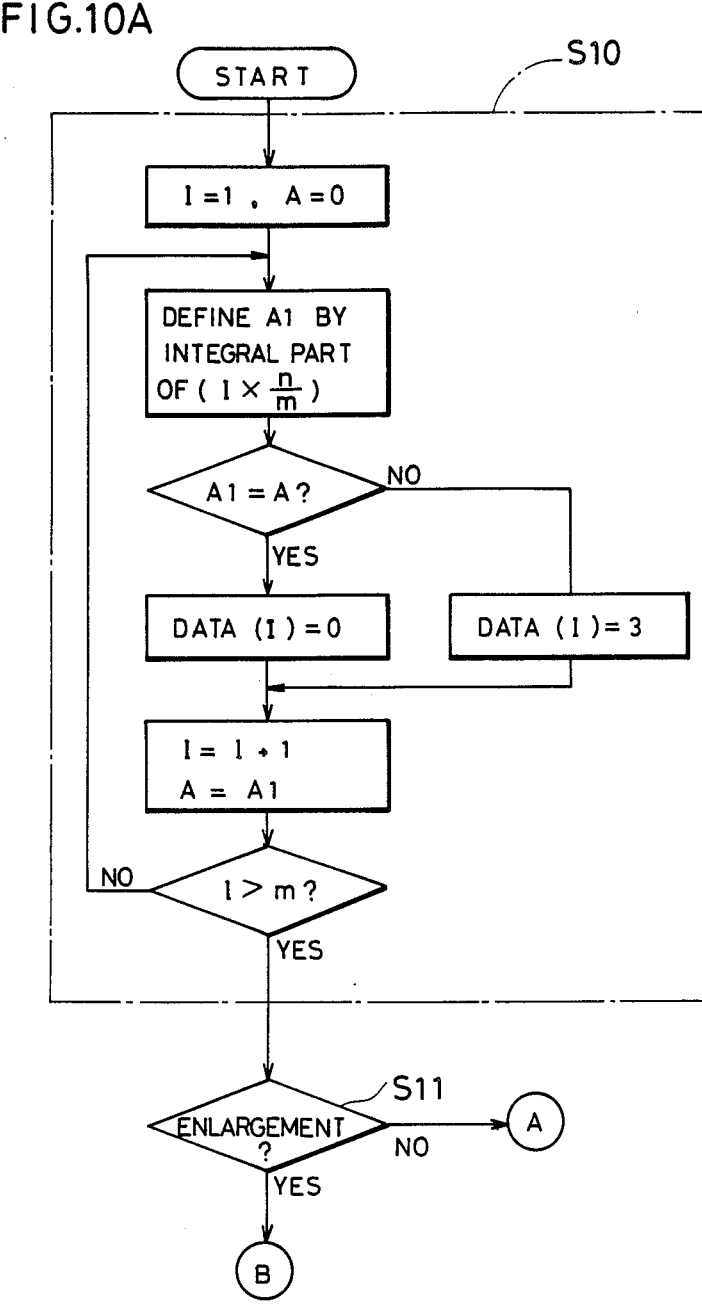
FIGS. 10A and 10B are a flow chart showing data producing processing in a clock memory of the first embodiment.
Figure 10B:
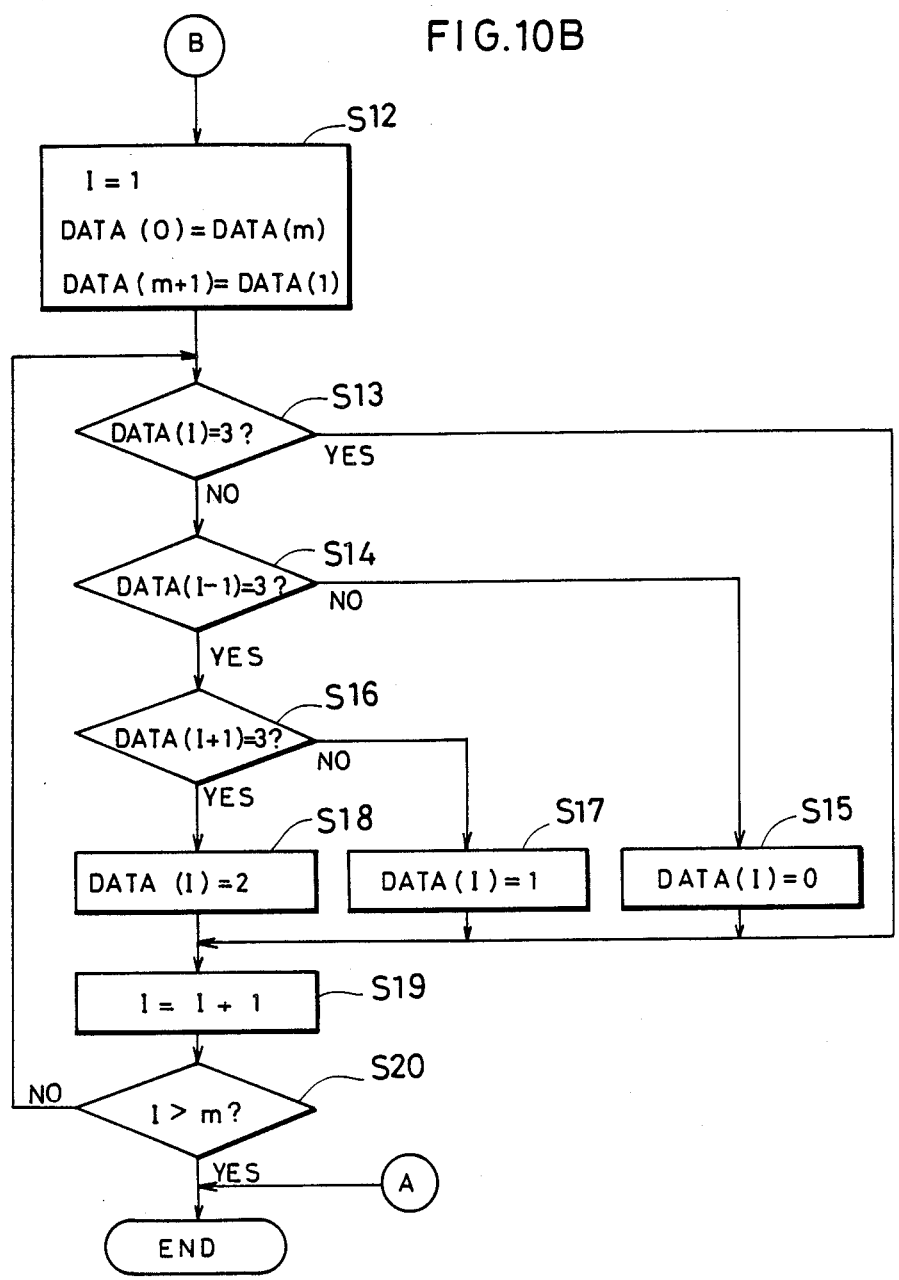

FIGS. 10A and 10B show processing for assigning such values. A routine S10 in FIG. 10 is identical to the routine as shown in FIG. 4 except for that the process in the case of A1=A (step S5) is performed as DATA-(I)=3, and detailed description thereof is omitted. Thus, obtained after completion of the routine S10 are data in which "1" is replaced by "3" in the data as shown in Table 1.

As a subsequent step S11, a determination is made as to whether or not the designated magnification indicates enlargement, and when the determenation is of no, no interpolation is required and the processing is completed. When the determination is of yes, the process is advanced to a step S12, at which I is assigned with 1 while 0-th and (m+1)th words are defined through use of data on m-th and first words respectively. Such definition is performed in consideration of case where the added pixel is in a position corresponding to the first or m-th word, in order to attain the data on the pixels adjacent to the added pixel, through the fact that the data are repeatedly used in a cyclic manner.

At a subsequent step S13, a determination is made as to whether or not the I-th word is in the value "3", and if the determination is of yes, the process is advanced to a step S19. In other words, no interpolation is required in this case since a pixel supplied by a non-defaulted clock pulse is an original pixel. On the other hand, when the I-th word is determined as a value other than "3", a further determination is made at a subsequent step S14 as to whether or not a (I−1)th word indicates "3". When the determination is of no, the word is assigned with "0" at a step S15. In this case, the pulse part corresponding to the I-th word is defaulted and a pixel immediately ahead of the added pixel thereby generated is also an added pixel, that is, the added pixel corresponds to $P_2$ as shown at FIG. 9(b), and hence the value "0" is assigned for indicating assignment of the value $(V_1+2V_2)/3$ in operation as hereinafater described.

When the (I−1)th word indicates "3" at the step S14, a determination is made at a step S16 as to whether or not the (I−1)th word is "3". If the determination is of no, the I-th word is assigned with "1" at a step S17. In this case, the (I−1)th and (I+1)th words adjacent to the I-th word indicate the original and added pixels respectively, the positional relation recognized as that shown by $P_1$ at FIG. 9(b), and hence $(2V_1+V_2)/3$ is assigned by the value "1". When the (I+1)th word is also determined as "3" at the step S16, the word indicates the added pixel interposed between the original pixels, and the word is assigned with "2" to provide $(V_1+V_2)/2$.

After the aforementioned data assignment, the value I is increased by 1 at a step S19 and a determination is made at a step S20 as to whether or not I is greater than m. If the value I is smaller than m, the process is returned to the step S12 to repeat the aforementioned processing, while the processing is completed when the value I becomes greater than m.

Figure 9:
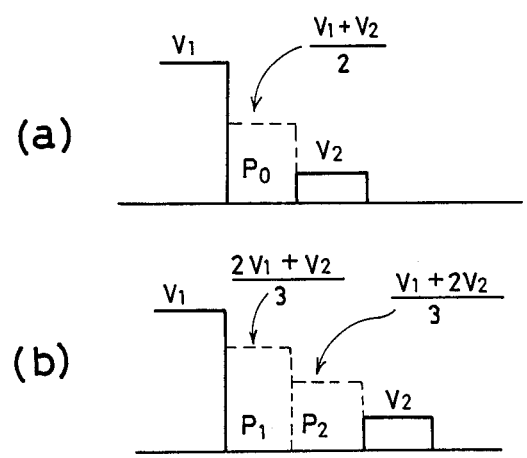
FIG. 9 is a diagram showing the principle of interpolation in the first embodiment.

Table 2 shows data obtained by the said processing, in which all of the values "1" in Table 1 are replaced by "3" and the values "0" in Table 1 are changed to any of "0" to "2" depending on the positional relation as shown in FIG. 9.

TABLE 2

| Magnification | Data in clock Memory | m | n |
|---|---|---|---|
| 100% | 3 | 1 | 1 |
| 101% | 3333333333333333333<br>3333333333333333333<br>3333333333333333333<br>3333333333333333333<br>3333333333333333333<br>2 | 101 | 100 |
| 102% | 3333333333333333333<br>3333333333333333333<br>33333333332 | 51 | 50 |
| 110% | 33333333332 | 11 | 10 |
| 120% | 333332 | 6 | 5 |
| 150% | 332 | 3 | 2 |
| 200% | 32 | 2 | 1 |
| 210% | 31032323232323232323<br>2 | 21 | 10 |
| 220% | 31032323232 | 11 | 5 |
| 240% | 310323103232 | 12 | 5 |
| 250% | 31032 | 5 | 2 |
| 260% | 3103103231032 | 13 | 5 |
| 300% | 310 | 3 | 1 |

(E) Operation of First Embodiment

Description is now made on the operation of the first embodiment in the aforementioned structure with reference to FIG. 8 and a timing chart as shown in FIG. 11. Briefly mentioned in the following description are components operated similarly to those of the related technical example. Further, consideration is made on the case of m=5 and n=2, i.e., enlargement at a ratio of 250% and reduction at a ratio of 40%.

Enlargement at 250%

In the enlargement at 250%, the magnification setting part 20 setting this magnification value operates data of m(=5) words ×2 bits (column of "250%" in Table 2) in accordance with the flow chart as shown in FIG. 10, to store the same in the clock memory 40 as shown in FIG. 8. Further, the register 38 is placed in an "enlargement" state.

When reading of the original 2 is started, the flip-flop 37 enters a state indicating "writing", and the address counter 36 is cleared. In advance to this, the other address counter 31 is loaded with the value m (=5), to sequentially supply cyclic address signals with periods for m pulses of the received pixel clocks CK1 (FIG. 11(a)) to the clock memory 40. As shown at FIG. 11(b), the clock memory 40 sequentially outputs the data stored therein in a cyclic manner. The AND circuit 31 gates the pixel clocks CK1 by the outputs from the clock memory 40 to generate the clocks CK3 as shown at FIG. 11(c) from which the pulses are regularly defaulted.

However, the selector 35 selects the A inputs, i.e., the pixel clocks CK1 in writing for enlargement as hereinafter described, and hence the address counter 36 outputs periodic address signals as shown at FIG. 11(d). Thereefore, the image data are written in the image memory 18 in response to the periodic pixel clocks CK1. In such writing operation, since the image memory 18 is in a data input state to make no data output, the interpolation arithmetic circuit 21 is not operated.

In reading operation, the flip-frop 37 indicates "reading" and hence the selector 35 selects the B inputs, i.e., the clocks CK3. Therefore, the address outputs from the address counter 36 corresponds in timing to the clocks CK3 as shown at FIG. 11(e) while the reading outputs from the image memory 18 also correspond in timing to the clocks CK3. The image data read in the aforementioned manner are supplied as data inputs to the D-FF 51 in the interpolation arithmetic circuit 21.

On the other hand, the D-FF 51 is supplied with clocks CK3 as the latch inputs, whereby the received image data are latched by the pulse intervals of the clocks CK3, to be transferred to the D-FF 52 in the subsequent stage, which in turn performs similar operation. Thus, the outputs $V_1$ from the D-FF 52 are image data delayed by two pulses of the clpocks CK3 while the outputs $V_2$ from the D-FF 51 are those delayed by one pulse, as shown at FIG. 11(f) and (g). Symbol $D_n$ denotes the image data, which are read in order of ... , $D_{-1}$, $D_0$, $D_1$, $D_2$, ...

Linear interpolation circuits 53a to 53c are adapted to operate interpolation values in response to the outputs $V_1$ and $V_2$, to supply the same to the selector 54. The selector 54 is also supplied with the outputs $V_1$ as the A inputs.

Selection inputs S of the selector 54 are obtained by the outputs from the clock memory 40, and hence selection of the A to D inputs is determined by the data "0" to "3" outputted from the clock memory 40. The outputs from the selector 54 in such selecting relation are shown at FIG. 11(h). Thus, the selector 55 in the subsequent stage is supplied as B inputs with signals controlled by values of the data stored in the clock memory 40.

The selector 55 is supplied as its A inputs with the outputs $V_1$ from the D-FF 52, and one of the two inputs A and B are selected by the S inputs from the register 38, which are adapted to select the B inputs of the selector 55 in enlargement. Thus, the selector 55 supplies enlarged image data obtained by assigning the interpolation values to the pixels added by default of the clock pulses to the halftone dot generator 22.

Reduction at 40%

The aforementioned data stored in the clock memory 40 in the enlargement at 250% can also be employed in reduction at the ratio of 40%. The operation of the momory address generation part 19 in the case of reduction is similar to that for enlargement except for that the clock pulses are defaulted in writing while reading operation is performed in timing by the pixel clocks CK1, and description thereof is omitted. However, it is to be noted that the selector 55 included in the interpolation arithmetic circuit 21 is supplied as the S inputs of the selector 55 included therein with signals to select the A inputs of the same from the magnification setting part 20. Thus, no outputs from the linear interpolation circuits 53a to 53c are supplied to the halftone dot generator 22, whereby the read out image data are always directly outputted.

(F) Effects of First Embodiment

According to the first embodiment of the present invention, the interpolation values are provided in the aforementioned operation thereby to obtain the image data as shown at FIG. 6(d) by naturally enlarging the original as shown at FIG. 6(a). Further, no inversion in gradation is caused as shown at FIG. 6(e) upon application of processing for enhancing sharpness. Also, when the image as shown at FIG. 7(a) is enlarged, finely stepped gradation boundary lines can be obtained as shown at FIG. 7(c).

In addition, the values n and m can be appropriately selected in the magnification at a ratio of (n/m)×100% or (m/n)×100%, thereby to arbitrarily reduce serration of the set magnification.

(G) Modifications of First Embodiment (G-1) Arbitrary Setting of Enlargement Range As hereinabove described, the data (selection data) for indicating the interpolation values to be assigned in response to the positions of the pixels added in enlargement are employed as composite data composed with the data expressing the rule for defaulting the clocks as shown in Table 2 in the aforementioned embodiment. In the structure as shown in FIG. 8, calculated are three linear interpolation values for the case where one added pixel is interpose between two original pixels and for the case where two added pixels are interposed between two original pixels, and the data to be stored in the clock memory 40 may be correspondingly formed such that data for selecting the interpolation values are within three types, corresponding to the range of 100 to 300% in magnification.

Required for enlargement exceeding a ratio of 300% is such an example as hereafter described. When an enlargement range of 100 to (100×N) % (N: integer), linear interpolation circuits are arranged in parallel for performing the following arithmetic:

$$[LV_1+(K-L)V_2]/K \tag{4}$$

where
 L=1, 2, 3, ..., (K−1)
 K=2, 3, 4, ..., N
Omittable is one of these performing substantially identical arithmetic, e.g., $$(2V_1+4V_2)/6 \qquad (5)$$

$$(V_1+2V_2)/3 \qquad (6)$$

Assuming that the number of the prepared linear interpolation circuits is represented by Q, words in P-bit length corresponding to the minimum integer P providing the following expression (7) are employed as the data to be stored in the clock memory 40:

$$(1+Q) \leq 2^P \qquad (7)$$

Thus, the information for defaulting the clocks as well as that for selecting the interpolation values can be indicated by the values indicated by the said words. Table 3 shows an example of structure according to this principle. Thus, the magnification can be set in an arbitrary range.

TABLE 3

| P | Linear Interpolation Circuit | Q | Magnification Variable Range (%) |
|---|---|---|---|
| 1 | $(V_1 + V_2)/2$ | 1 | 100-200 |
| 2 | $(V_1 + V_2)/2$ | 3 | 100-300 |
|   | $(2V_1 + V_2)/3$ | | |
|   | $(V_1 + 2V_2)/3$ | | |
| 3 | $(V_1 + V_2)/2$ | 5 | 100-400 |
|   | $(2V_1 + V_2)/3$ | | |
|   | $(V_1 + 2V_2)/3$ | | |
|   | $(3V_1 + V_2)/4$ | | |
|   | $(V_1 + 3V_2)/4$ | | |
| 4 | $(V_1 + V_2)/2$ | 7 | 100-600 |
|   | $(2V_1 + V_2)/3$ | | |
|   | $(V_1 + 2V_2)/3$ | | |
|   | $(3V_1 + V2)/4$ | | |
|   | $(V_1 + 3V_2)/4$ | | |
|   | $(4V_1 + V_2)/5$ | | |
|   | $(3V_1 + 2V_2)/5$ | | |
|   | $(2V_1 + 3V_2)/5$ | | |
|   | $(V_1 + 4V_2)/5$ | | |
|   | $(5V_1 + V_2)/6$ | | |
|   | $(V_1 + 5V_2)/6$ | | |
| 5 | $(V_1 + V_2)/2$ | 21 | 100-800 |
|   | $(2V_1 + V_2)/3$ | | |
|   | $(V_1 + 2V_2)/3$ | | |
|   | $(3V_1 + V_2)/4$ | | |
|   | $(V_1 + 3V_2)/4$ | | |
|   | $(4V_1 + V_2)/5$ | | |
|   | $(3V_1 + 2V_2)/5$ | | |
|   | $(2V_1 + 3V_2)/5$ | | |
|   | $(V_1 + 4V_2)/5$ | | |
|   | $(5V_1 + V_2)/6$ | | |
|   | $(V_1 + 5V_2)/6$ | | |
|   | $(6V_1 + V_2)/7$ | | |
|   | $(5V_1 + 2V_2)/7$ | | |
|   | $(4V_1 + 3V_2)/7$ | | |
|   | $(3V_1 + 4V_2)/7$ | | |
|   | $(2V_1 + 5V_2)/7$ | | |
|   | $(V_1 + 6V_2)/7$ | | |
|   | $(7V_1 + V_2)/8$ | | |
|   | $(5V_1 + 3V_2)/8$ | | |
|   | $(3V_1 + 5V_2)/8$ | | |
|   | $(V_1 + 7V_2)/8$ | | |
| ... | ... | | ... |

(G-2) Data Setting

Although the data for defaulting the clocks and those for selecting the interpolation values are prepared as the composite data in the aforementioned embodiment, the present invention is not restricted to such a mode. The said data may be separately prepared to be read in a related manner so that the default of the clocks and the selection of the interpolation values are carried out as in the above.

(G-3) Interpolation Arithmetic Circuit

Although the linear interpolation is performed as interpolation arithmetic in the aforementioned embodiment, interpolation other than the linear interpolation may be employed. Further, the method of fetching the data on the original pixels for the interpolation is not restricted to that employing the aforementioned D-FFs.

(G-4) Other Factors

Although the above embodiment has been applied to a process color scanner to generate outputs in halftone dots, the present invention is not restricted to such application, but can be applied to any other apparatus such as a process scanner, a facsimile, a copying machine etc. for enlarging images. Since image input/output operation may be not be optically performed, the present invention is also applicable to an apparatus which electrically or magnetically performs input/output operation.

Further, significant pixels are substantially increased in number by the interpolation according to the present invention, which is thus applicable to transmission of image data between input and output units in different sampling pitches.

According to the first embodiment of the present invention as herein-above described, an even image can be obtained in a wide magnification variable range with an image processor which can obtain a natural image by smoothing space gradation changes of the reproduced image in enlargement.

(H) Entire Structure of Second Embodiment

Description is now made on a second embodiment of the present invention which employs a one-dimensional photoelectric convetrsion element array device as an input device of an image scanning/recording unit such as a scanner or a facsimile to apply interpolation processing according to the present invention to processing of image signals obtained by photoelectrically scanning an original by the one-dimensional photoelectric conversion element array device.

Figure 12:
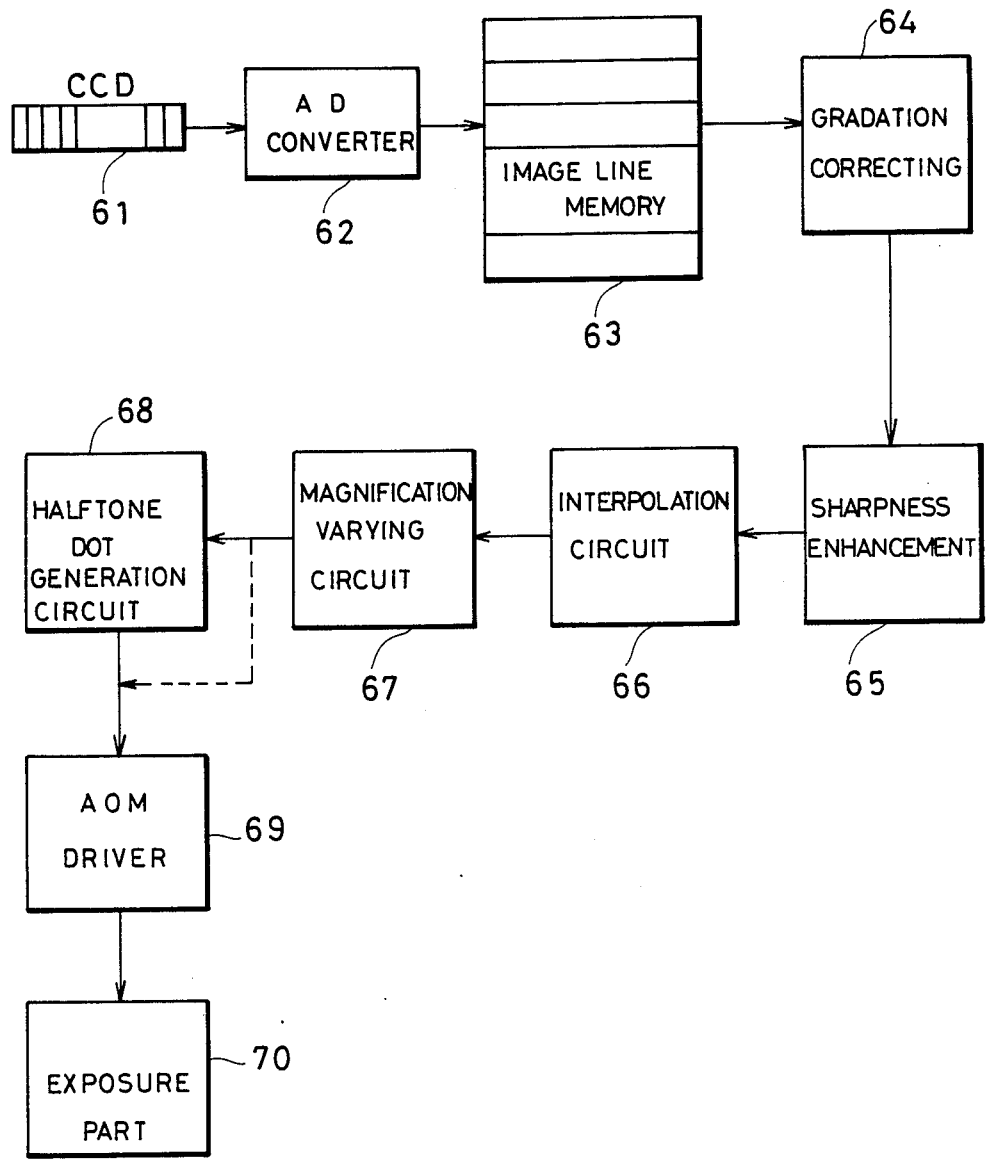
FIG. 12 is a block diagram showing an example of a process scanner to which a second embodiment of the present invention is applied.

FIG. 12 is a block diagram showing an example of a process scanner to which the present invention is applied. The structure as shown in FIG. 12 is similar to that of the image signal transmission path defined between the pickup head 10 and the exposure head 11 as shown in FIG. 1, except for that arrangement is different in order and the interpolation arithmetic circuit 21 is replaced by an interpolation circuit 66. A one-dimensional storage type photoelectric conversion element (hereinafter referred to as CCD) such as a CCD line sensor photoelectrically scans an original (not shown) to obtain input image signals, which are converted to multi-gradation digitial image signals by an A-D converter 62 to be temporarily stored in a plurality of line memories 63 for storing the input image signals. The image signals appropriately read from the line memories 63 are corrected in gradation (with color correction in case of color image signals) in a gradation correcting circuit 64 and subjected to processing for enhancing sharpness with respect to at least one of the main and vertical scanning directions in a shrpness enhancing circuit 65, to be supplied to the interpolation circuit 66.

The interpolation circuit 66 performs interpolation processing according to the present invention, details of which are hereinafter described. The interpolated image signals are converted into image signals in a desired magnification value by a magnification varying circuit 67, to be subjected to halftone dot generation processing by a halftone dot generation circuit 68. AN AOM (acoustic optical converter) driving circuit 69 receives signals from the halftone dot generation circuit 68 to drive an exposure part 70, thereby to record a desired halftone dot image on a photosensitive material (not shown). In case of recording continuous tone images including characters, no such halftone dot generation is performed by the haftone dot generation circuit 68 as shown by the dot line in FIG. 12. The aforementioned structure of the process scanner is well known in the art except for the interpolation circuit 66.

(I) Image Input Optical System

Figure 13:
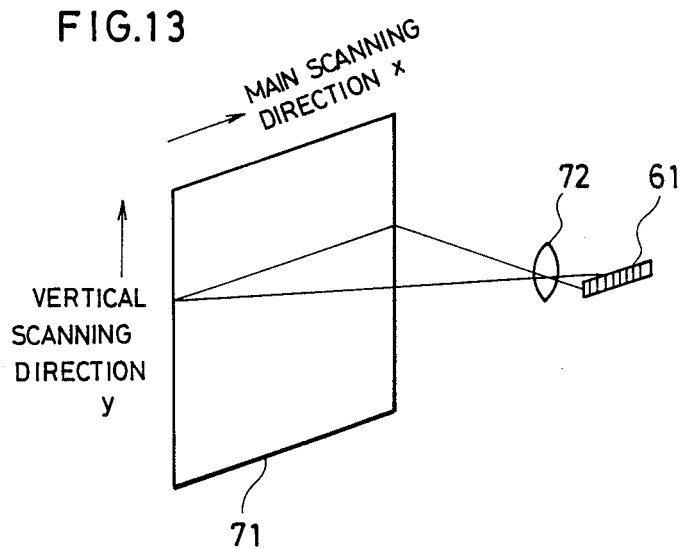
FIGS. 13 and 14 are conceptual diagrams showing an image input optical system.
Figure 14:
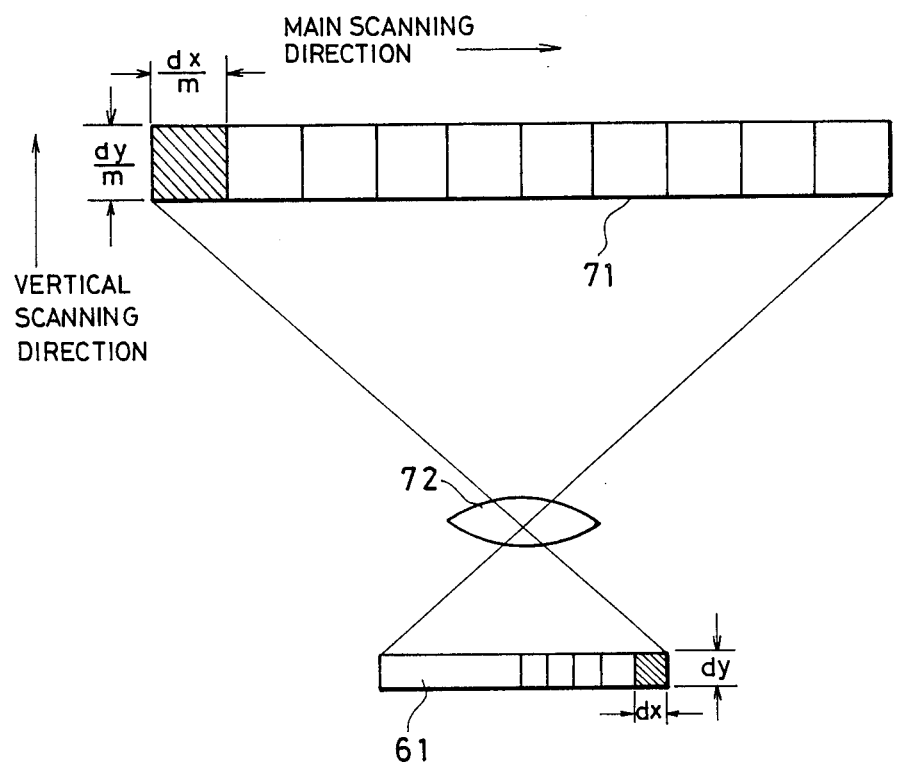

FIGS. 13 and 14 are conceptual diagrams showing an image input optical system including the CCD 61. The respective photoelectric conversion elements of the CCD 61 are arrayed along the main scanning direction, so that light reflected by an original 71 forms an image on the CCD 61 through a converging lens 72. With reference to FIG. 14, input resolution (number of read pixels per unit legth in case of photoelectrically scanning the original) is determined by the magnification (m) of the optical system and the size of each element of the CCD 61, and assuming that $L_{inx}$ represents input resolution in the main scanning direction and $L_{iny}$ represents input resolution in the vertical scanning direction while $d_x$ and $d_y$ represent length of each element of the CCD 61 in the main and vertical scanning directions, established are the following relational expressions:

$$L_{inx} = m/dx \text{ (line/mm)} \tag{8}$$

$$L_{iny} = m/dy \text{ (line/mm)} \tag{9}$$

Thus, in order to improve the input resolution, the size of each element may be minimized or the magnification of the optical system may be increased to increase the number of the elements in one scannig line. It is to be noted that no consideration is made on factors related to efficiency such as storage times, operation frequencies and the like in this case. Such improvement of the input resolution by the size is restricted as hereinabove described.

In general, when the image signals supplied to the halftone dot generation circuit 68 are in resolution of about 10 to 20 lines/mm (250 to 500 lines/inch) in the aforementioned process scanner, the halftone dot image recorded on the photosensitive material is generally satisfactory in quality. However, higher resolution is preferable for further accurate process printing or processing of a line original, and in such case, output resolution of an image processing circuit including the A-D converter 62, . . . and the magnification varying circuit 67 preferably exceeds, e.g, 39.4 lines/mm (1000 lines/inch). Now consider that, as an example in design, the output resolution is 59.1 lines/mm (1500 lines/inch) to process a paper of A4 size (297×210 mm) with its shorter side being vertically scanned by a CCD having 5000 elements in one minute. In this case, the number of recording times in the vertical scanning direction per second is 210×59.1−60=206.9 (times/sec), and hence each recording time for one scanning line is about 5 ms. In order to obtain input resolution in the vertical scanning direction similar to the output resolution, therefore, illumination must be set so that the storage time of the CCD is about 5 ms, whereby considerably strong illumination is required.

Further, in order to obtain similar input resolution also in the main scanning direction, the CCD requires 297×59.1=17553 elements. Thus, in the case of the CCD having 5000 elements, four elements must be linearly arrayed in a partially doubled manner, with arising of difficult problems to be solved such as connection between such CCDs and adjustment of horizontal registration to implement the optical system. Further, the storage time must be set at about 5 ms as hereinabove described, and hence the transfer clock frequencey of the stored charge is $17,553 \div (5 \times 10^{-3}) \approx 3.5 \times 10^6$ (Hz). In order to process outputs obtained at this repeating speed by one A-D converter, the conversion speed thereof must be smaller than about 0.3 μs. In general, the conversion speed of an A-D converter of about 12 bits for high gradation employed for process exceeds 1 μs, and hence parallel processing by a plurality of A-D converters is required to cause complicatedness of the circuit and increase in cost.

Thus, in the case of an apparatus such as a process scanner requiring high output resolution, it is not preferable to improve the input resolution to a level equivalent to the output resolution. In consideration of characteristics of CCDs and A-D converters, it is rather effective to set input resolution at a level lower than the output resolution to interpolate input image signals in at least one of the main and vertical scanning directions with respect to the difference in level thereby to improve the picture quality of the image outputted in high resolution.

(J) Structure of Interpolation Circuit in Second Embodiment

Figure 15:
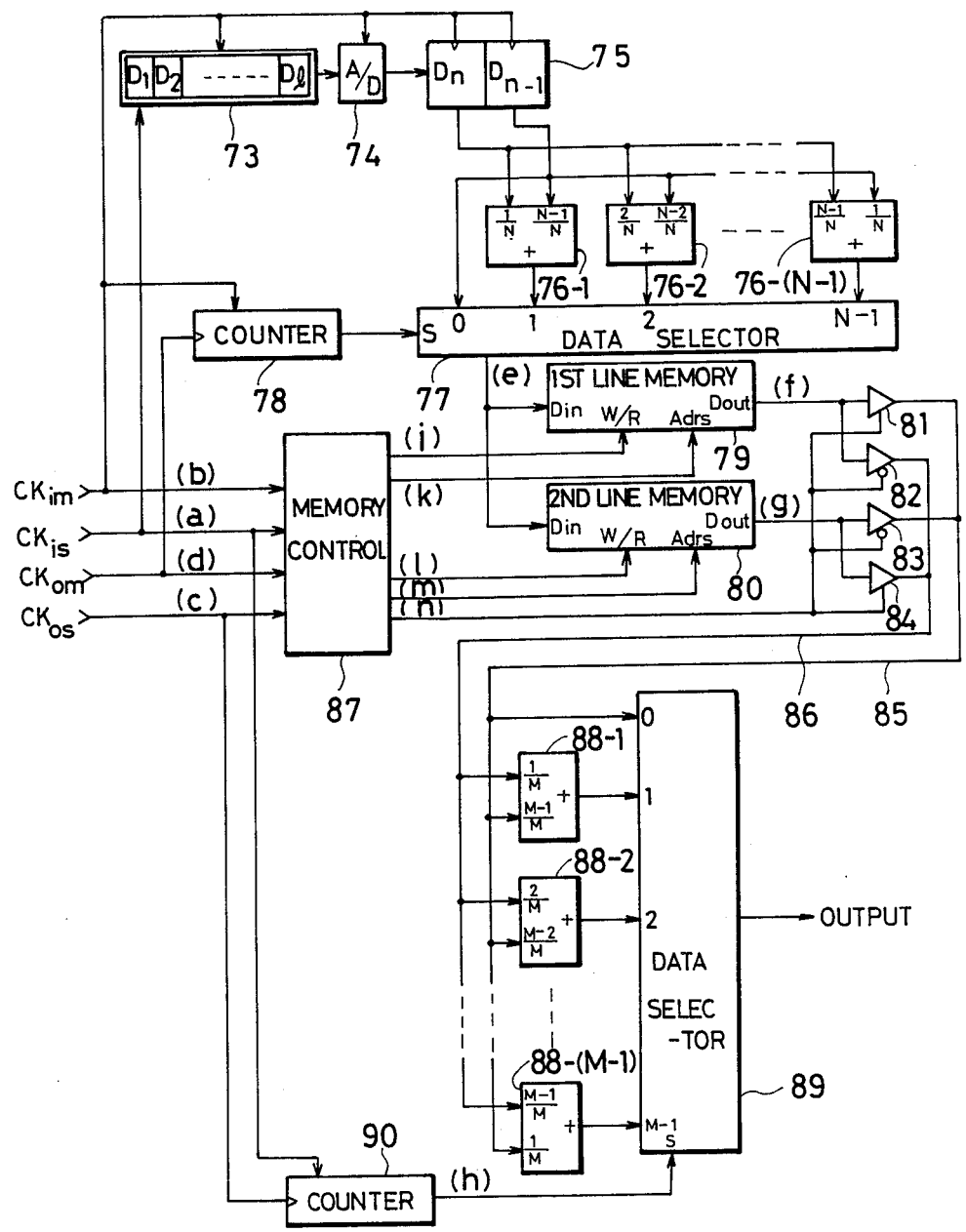
FIG. 15 is a block diagram showing an example of an interpolation circuit of the second embodiment.

The interpolation circuit 16 as shown in FIG. 12 is provided to attain the aforementioned object, and FIG. 15 is a block diagram showing an example of structure thereof. A CCD 73 and an A-D converter 74 as shown in FIG. 15 correspond to the CCD 61 and the A-D converter 62 in FIG. 12. Interpolation processing is performed by a shift register 75 etc., while circuits for correcting gradation and enhancing sharpness etc. will be provided between the A-D converter 74 and the shift register 75 as shown in FIG. 15 in a practical process scanner, as shown in FIG. 12.

The CCD 73 and the A-D converter 74 are formed by only one generally available ones of about 5000 elements and 12 bits respectively. Repeating frequencies of clock signals $CK_{im}$, $CK_{is}$, $CK_{om}$ and $CK_{os}$ supplied from a clock generator (not shown) are appropriately selected so as to set the ratio of the input resolution to the output resolution at, e.g., 1:4 in both of the main and vertical scanning directions. Thus, even if high output resolution is required for, e.g., process printing, the CCD 73 and the A-D converter 74 in the aforementioned conditions can be employed to form the scanner for the process. An example of a concrete design under such conditions is hereinafter described.

In the structure of the interpolation circuit as shown in FIG. 15, the two-stage shift register 75 temporarily stores digital image signals from the A-D converter 74 by two pixels $D_n$ and $D_{n-1}$ which are continuous in the main scanning direction. Adders (76-1, 76-2, . . . , 76-(N−1)) are adapted to receive the image signals $D_n$ and $D_{n-1}$ to perform prescribed interpolation arithmetic. Symbol N herein used indicates the ratio of the output resolution to the input resolution in the main scanning direction, which ratio is set at 4 as hereinabove described. Therefore, three adders 76 are provided in this case so that the adder 76-1 operates $(3D_{n-1}+D_n)/4$ and the adder 76-2 operates $(2D_{n-1}+2D_n)/4$ while the adder 76-3 operates $(D_{n-1}+3D_n)/4$. In general, interpolated image signals are generated by arithmetic as shown in the following Table 4 in response to the value N.

TABLE 4

| N | Operational Expressions for Generating Interpolated Image Signals | | | Number of Interpolated Signals |
|---|---|---|---|---|
| 2 | $\dfrac{D_{n-1} + D_n}{2}$ | | | 1 |
| 3 | $\dfrac{2D_{n-1} + D_n}{3}$, | $\dfrac{D_{n-1} + 2D_n}{3}$ | | 2 |
| 4 | $\dfrac{3D_{n-1} + D_n}{4}$, | $\dfrac{2D_{n-1} + 2D_n}{4}$, | $\dfrac{D_{n-1} + 3D_n}{4}$ | 3 |
| . | . | | | . |
| . | . | | | . |
| . | . | | | . |
| N | $\dfrac{(N-1)D_{n-1} + D_n}{N}$, | $\dfrac{(N-2)D_{n-1} + 2D_n}{N}$, $\ldots \dfrac{D_{n-1} + (N-1)D_n}{N}$ | | $N-1$ |

The adders 76-1, 76-2, ... may be formed by, e.g., look-up tables, and in such case, two input terminals may be provided with look-up table memories for multiplying $1/N$ and $(N-1)/N$, ... etc. by $D_n$ or $D_{n-1}$ (e.g., table memories for reading results of multiplication with addresses of the pixel data $D_n$ or $D_{n-1}$ which is converted from 12 bits to 8 bits in LOG conversion generally appleid to a process scanner, description of which conversion is herein omitted) to add up to the outputs thereof. It is to be noted that, with respect to an item which may obtain the mean value of $D_n$ and $D_{n-1}$, the said values can be simply added up to shift the result by 1 bit.

A data selector 77 has N input terminals 0, 1, 2, ..., N−1, such that the input terminal 0 receives the image signals $D_{n-1}$ from the shift register 75, the input terminal 1 receives the output signals from the adder 76-1, the input terminal 2 receives the output signals from the adder 76-2, ... and the input terminal N−1 receives the output signals from the adder 76-(N−1). The received signals are sequentially selected in response to output count numbers of an N-ary counter 78, to be outputted from the data selector 77.

The outputted image signals are alternately stored in first and second line memories 79 and 80 respectively by one scanning line. Then the signals are respectively read on read lines 85 and 86 through tri-state buffer amplifiers 81 to 84 which function as gates. The tri-state buffer amplifiers 81 to 84 are so controlled in timing that the image signals for one scanning line scanned in advance are always read on the read line 85. A memory control 87 controls the said timing and the timing for writing/-reading the signals in/from the first and second line memories 79 and 80.

Adders 88-1, 88-2, ... , 88-(M−1) are adapted to receive the image signals for adjacent two scanning line which are read on the read line 85 and 86 to perform prescribed interpolation arithmetic on the same. Symbol M indicates the ratio of the output resolution to the input resolution in the vertical scanning direction, which value M is set at 4 similarly to the aforementioned value N. Therefore, three adders 88 are required similarly to the adders 76. The interpolation arithmetic to be performed by the adders 88 is identical to that performed by the aforementioned adders 76, and in general, interpolated image signals are generated by replacing the value N by M in the above Table 4. Symbols $D_{n-1}$ and $D_n$ in the Table 4 indicate a pair of image signals which are adjacent in the main scanning direction with respect to the adders 76, while the same indicate a pair of image signals which are adjacent in the vertical scanning direction with respect to the adders 88. The adders 88 may be formed by look-up tables, similarly to the aforementioned adders 76.

A data selector 89 has M input terminals 0,1,2, ..., M−1, so that the input terminal 0 receives the image signals on the read line 85, i.e., the image signals for the one scanning line scanned in advance, the input terminal 1 receives the output signals from the adder 88-1, the input terminal 2 receives the output signals from the adder 88-2, ... and the input terminal M−1 receives the output signals from the adder 88-(M−1). These signals are sequentially selected in response to output count numbers of an M-ary counter 90, to be outputted from the data selector 89.

(K) Operation of Interpolation Circuit

Figure 16:
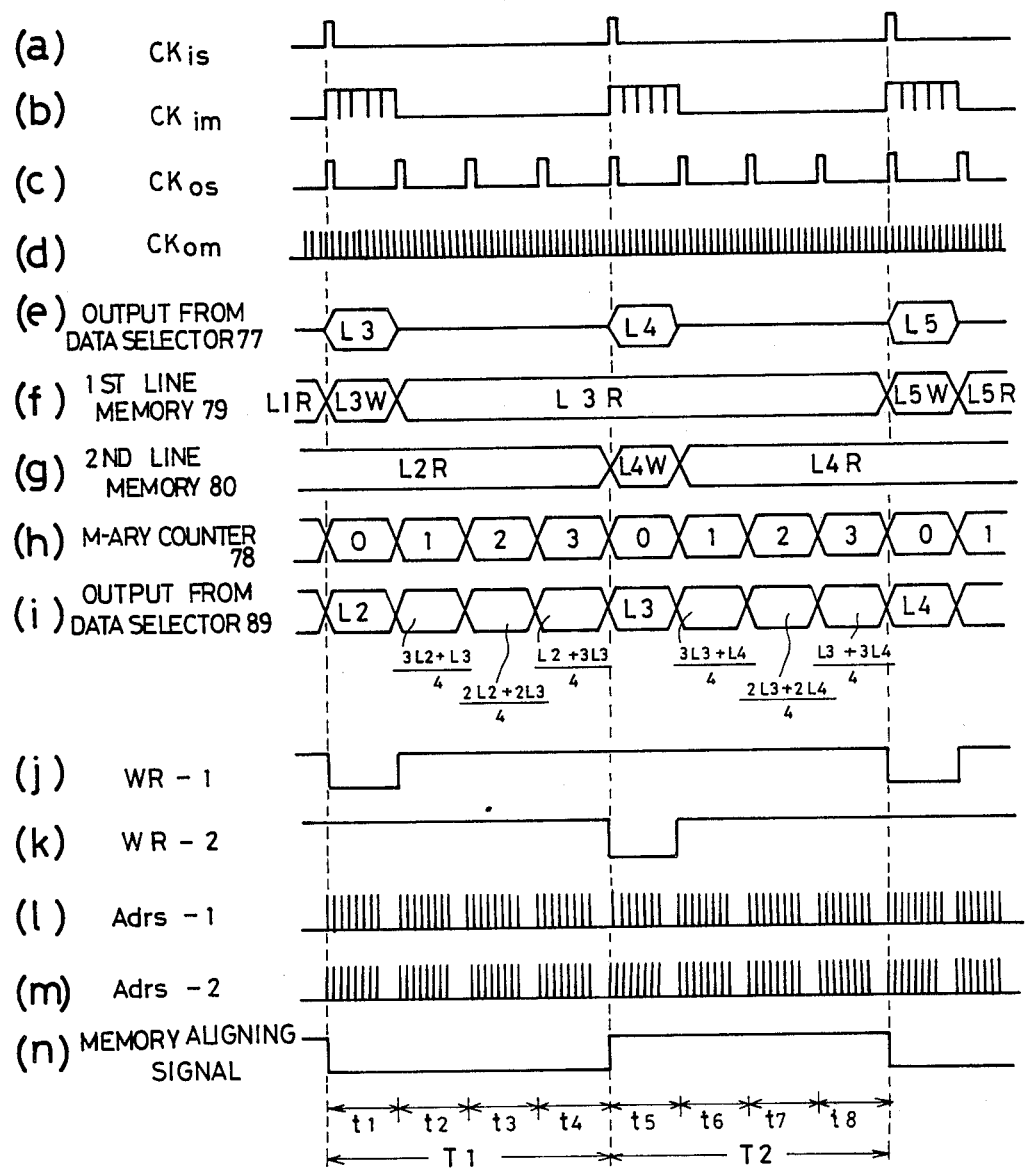
FIG. 16 is a timing chart showing the operation of the interpolation circuit as shown in FIG. 15.

FIG. 16 is a timing chart showing the operation of the interpolation circuit as shown in FIG. 15. With reference to FIG. 16, description is now made on the operation of the interpolation circuit as shown in FIG. 15. The CCD 73 receives input vertical scanning clock signals $CK_{is}$ as shown at FIG. 16(a) to enable transfer of charges stored in the respective photoelectric conversion elements and then sequentially transfers and reads the stored charges synchronously with input main scanning clock signals $CK_{im}$ as shown at FIG. 16(b). The image signals this obtained are converted to 12-bit multigradation digital image signals by the A-D converter 74.

FIG. 17(a) typically illustrates parts of the input image signals, and each of symbols A to J indicates one pixel. The input resolution is set to be ¼ of the output resolution in both of the main and vertical scanning directions as hereinabove described, and FIG. 17(b) typically illustrates parts of the image signals to be outputted. Each of symbols A to J in dot lines denotes the input image signal correspolding to one pixel, and one pixel area of the output image signal corresponds to the slanted portion as shown in the upper left part. According to the present invention, the input image signals obtained in FIG. 17(a) are interpolated to be improved in picture quality when outputted in high resolution as shown in FIG. 17(b).

The two-stage shift register 75 temporarily stores the image signals $D_n$ and $D_{n-1}$ for two pixels adjacent in the main scanning direction. For convenience of illustration, it is assumed here that $D_{n-1}$ represents an image signal (hereinafter referred to as A) corresponding to a pixel A and $D_n$ represents an image signal (hereinafter referred to as B) corresponding to a pixel B. These image signals are supplied to respective input terminals of the data selector 77 directly or through interpolation arithmetic by the adders 76. Since the value N is equal to four, the input terminal 0 directly receives the signal A and the input terminal 1 receives $(3A+B)/4$ while the input terminal 2 receives $(2A+2B)/4$ and the input terminal 3 receives $(A+3B)/4$.

The data selector 77 sequentially selects and outputs these input signals in response to the count values of the N-ary counter 78. The N-ary counter 78 is reset by the input main scanning clock signals $CK_{im}$ which serve as clock signals for the shift register 75, to count output main scanning clock signals $CK_{om}$ which are four times the said clock signals in frequency. Thus, during the period when the shift register 75 temporarily stores the signals A and B, i.e., a period for reading a pixel C as shown in FIG. 17(a) within one input main scanning interval, the data selector 77 sequentially outputs A, $(3A+B)/4$, $(2A+2B)/4$ and $(A+3B)/4$. The image signals thus interpolated in the main scanning direction are shown in the uppermost and fifth lines of FIG. 17(c).

The image data completely interpolated in the main scanning direction are alternately written in the first and second line memories 79 and 80 line by line under control by the memory control 87. The image signals interpolated in the main scanning doirection and outputted from the data selector 77 are shown at FIG. 16(e), in which symbols L3, L4 and L5 indicate the signals on the third, fourth and fifth scanning lines respectively. The memory control 87 supplies write/read control signals WR-1 and WR-2 as shown at FIG. 16(j) and (k) for indicating writing at low levels and address clock signals Adrs-1 Adrs-2 as shown at FIG. 16(l) and (m) to the first and second line memories 79 and 80 respectively, so that the image signals L3, L4 and L5 for the respective scanning lines are alternately written in the first and second line memories 79 and 80 line by line in response as shown at FIG. 16(f) and (g). Symbols L3W and L5W at FIG. 16(f) indicate the image signals L3 and L5 written in the first line memry 79, while symbol L4W at FIG. 16(g) indicates the image signal L4 written in the second line memory 80.

The image signals L3,L4 and L5 for the respective ones of the scanning lines thus written in the first and second line memories 79 and 80 are sequentially read in response to conversion to high levels of the write/read control signals WR-1 and WR-2 as shown at FIG. 16(j) and (k) in accordance with address clocks as shown at FIG. 16(l) and (m) in a repeated manner. Respective one write/read time for one scanning line is determined by output vertical scanning clock signals $CK_{os}$ as shown at FIG. 16(c), based on which the memory control 87 produces the write/read control signals WR-1 and WR-2 at FIG. 16(j) and (k) and the address clocks Adrs-1 and Adrs-2 at FIG. 16(l) and (m) to supply the same to the first and second line memories 79 and 80 respectively. Symbols L1R, L3R, L5R, L2R and L4R at FIG. 16(f) and (g) indicate the imgae signals L1, L3, L5, L2 and L4 thus read in a repeated manner. According to this embodiment, an image signal is repeatedly read seven times such that, for example, the image signal L3 for one scanning line is continuously read seven times in a repeated manner as shown in the data part L3R at FIG. 16(f).

The image signals thus read from the first and second line memories 79 and 80 are distributed by the tri-state buffer amplifiers 81 to 84 serving as gates to be derived on either read line 85 or 86 respectively. The memory control 87 supplies memory aligning signals as shown at FIG. 16(n) to the respective tri-state buffer amplifiers 81 to 84 to control such distribution of the image signals. In an interval T1, for example, the memory control 87 supplies low-level memory aligning signals to make the tri-state buffer amplifiers 81 and 84 open state. Therefore, the image signal L3 read from the first line memory 79 is derived on the read line 86 through the tri-state buffer amplifier 82 while the image signal L2 (scanned and written in advance to the signal L3) read from the second line memory 80 is derived on the read line 85 through the tri-state buffer amplifier 83. Thus, timing control is so performed that the image signals scanned and written in advance are always derived on the read line 85.

Description is now made on the operation with respect to the intervl T1 in FIG. 16, with assumption that signals A, $(3A+B)/4$, ... on the first line in FIG. 17(c) correspond to the image signal L2 for one scanning line and signals D, $(3D+E)/4$, ... on the fifth line correspond to the image signal L3 for one scanning line. The M-ary counter 90 is reset by the input vertical scanning clock signals $CK_{is}$ as shown at FIG. 16(a), to count (upcount in this case) the output vertical scanning clock signals $CK_{os}$ as shown at FIG. 16(c). Since the value M is equal to four in this embodiment, the M-ary counter 90 repeatedly outputs 0, 1, 2 and 3 synchronously with the output vertical scanning clocks $CK_{os}$ as shown at FIG. 16(h).

When the M-ary counter 90 outputs the count value 0, the data selector 89 selects the signals received in the input terminal 0 to output the same. At this time, the input terminal 0 receives the image signal L2 for one scanning line read from the second line memory 80 to be derived on the read line 85, i.e., the signals A, $(3A+B)/4$, ... whereby the data selector 89 sequentially outputs the image signals A, $(3A+B)/4$, ... for one scanning line, as indicated by symbol L2 at FIG. 16(i) which shows the outputs from the data selector 89. The output rate depends on the speed for reading the respective image signals from the second line memory 80, while the address clocks Adrs-2 at FIG. 16(m) may be so determined that the respective image signals are outputted in synchronization with the output main scanning clock signals $CK_{om}$. This also appies to the case of reading from the first line memory 79. Thus, the signals on the first line of FIG. 17(c) are outputted in a period t1 as shown in FIG. 16.

Then, when the M-ary counter 90 outputs the count value 1, the data selector 89 selects the signals received in the input terminal 1, i.e., the output signals from the adder 88-1 to output the same. Since M=4 and the signals on the read line 85 are L2 (i.e., A, $(3A+B)/4$, ...) and the signals on the read line 85 are L3 (i.e., D, $(3D+E)/4$, ...), the adder 88-1 operates $(3L2+L3)/4$ per respective pair of image signals (e.g., A and D; $(3A+B)/4$ and $(3D+E)/4$ etc.) received in the input terminal 1 synchronously with the output main scanning clock signals $CK_{om}$ to output the saim. The results are $(3A+D)/4$, $(9A+3B+3D+E)/16$, ... as shown on the second line in FIG. 17(c), and these interpolated image signals for one scanning line are outputted from the data selector 89 in a period t2 in FIG. 16. It is shown as $(3L2+L3)/4$ at FIG. 16(i).

Thereafter in a similar manner, the adder 88-2 operates $(2L2+2L3)/4$ corresponding to the third line in FIG. 17(c) in a period t3 as shown in FIG. 16 whereby the data selector 89 outputs the result in response to the count value 2 of the M-ary counter 90, while the adder 88-3 operates (L2+3L3)/4 corresponding to the fourth line in FIG. 17(c) in a subsequent period t4, whereby the data selector 89 outputs the result in response to the count value 3 of the M-ary counter 90. Thus, the signals as shown in the first to fourth lines of FIG. 17(c) are sequentially outputted in synchronization with the output vertical scanning clock signals $CK_{os}$ in the interval T1 as shown in FIG. 16, which is a unit input vertical scanning interval corresponding to the unit input storage time of the CCD 73.

In a subsequent interval T2, the memory aligning signals as shown at FIG. 16(n) are phase-inverted, whereby the image signal L3 from the first line memory 79, i.e., the signals D, (3D+E)/4, ... are derived on the read line 85. In a first period t5 of the interval T2, the data selector 89 outputs the said image signals in response to the count value 0 of the M-ary ounter 90. Thus, the signals on the fifth line are outputted subsequently to those on the first to fourth lines in FIG. 17(c). Also in this period t5, the subsequent input image signal L4 from the CCD 73 is written in the second line memory 80. This image signal L4 is read on the read line 86 in subsequent periods t6 to t8, whereby the respective adders 88 perform interpolation arithmetic in the vertical direction similarly to the above, so that the data selector 89 sequentially outputs signals on the sixth to eighth lines in FIG. 17(c).

Thus, the input image signals obtained in the resolution as shown in FIG. 17(a) are subjected to interpolation arithmetic in the main and vertical directions to be outputted in the resolution as shown in FIG. 17(b), whereby obtained are the image signals as shown in FIG. 17(c).

FIG. 18 shows examples of input image signals (a) and output imge signals (b) which are subjected to the aforementioned interpolation. In FIG. 8, the ordinate indicates pitches in the main or vertical scanning direction and the abscissa indicates, e.g., density values. Performed in FIG. 18 is interpolation of four times, i.e., the ratio of the input resolution to the output resolution is 1:4, and it is clearly understood that the picture quality is smoothly improved.

(L) Another Example of Interpolation Circuit

Figure 19:
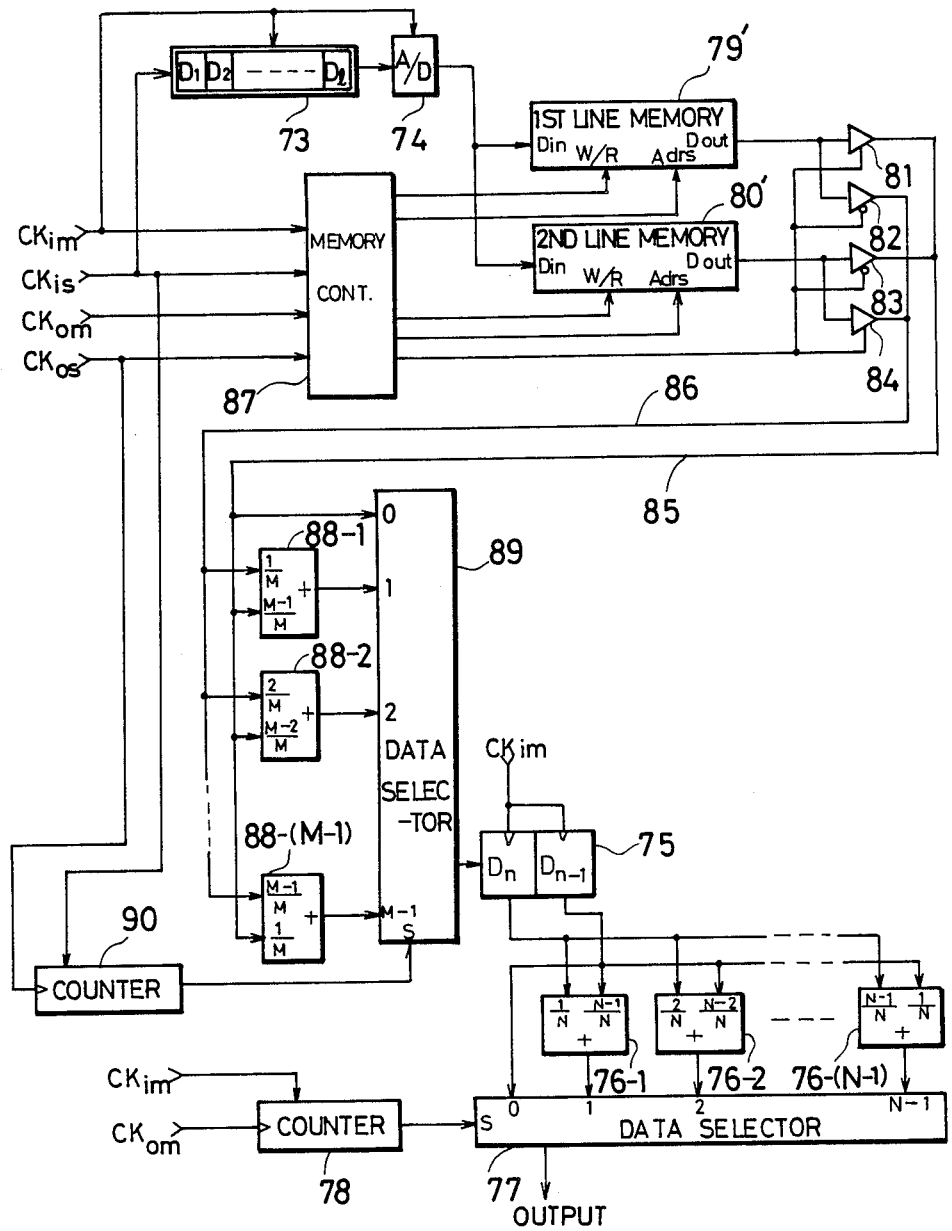
FIG. 19 is a block diagram showing another example of the interpolation circuit of the second embodiment.

FIG. 19 is a block diagram showing another example of the interpolation circuit. The interpolation circuit as shown in FIG. 19 basically functions similarly to that shown in FIG. 15, except for that the same first performs interpolation in the vertical scanning direction and then performs interpolation in the main scanning direction. In other words, the interpolation circuit as shown in FIG. 19 is different only in sequence of interpolation from that shown in FIG. 15, and the functional parts of both circuits are identical in structure and operation to each other. Therefore, the following description is made only on the sequence of interpolation, while the above description with reference to FIG. 15 is applied to the other components of the circuit as shown in FIG. 19.

In the interpolation circuit as shown in FIG. 19, first and second line memories 78' and 80' are adapted to alternately store input image signals from an A-D converter 74 line by line respectively. For example, it is assumed here that the signals A, B, C, ... on the first line in FIG. 17(a) are written in the first line memory 79' and the signals D, E, F, ... on the second line are written in the second line memory 80'. At this time, adders 88 perform interpolation arithmetic in the vertical scanning direction so that a data selector 89 sequentially outputs the signals A, B, ..., (3A+D)/4, (3B+E)/4, ..., (2A+2D)/4, (2B+2E)/4, ..., and (A+3D)/4, (B+3E)/4, ...

Then, a two-stage shift register 75 temporarily stores in a sequential manner every pair of the image signals for one scanning line sequentially outputted as hereinabove described. For example, assuming that the shift register 75 stores the signals A and B, adders 76 perform interpolation arithmetic in the main scanning direction so that the data selector 77 sequentially outputs the signals A, (3A+B)/4, (2A+2B)/4 and (A+3B)/4 from its output terminal. Then the shift register 75 stores the signals B and C thereby to sequentially output the subsequent signals B, (3B+C)/4, (2B+2C)/4 and (B+3C)/4 on the first line. Thus, the interpolation in the main scanning direction is performed subsequentily to that in the vertical scanning direction, whereby the image signals are outputted similarly to those from the interpolation circuit as shown in FIG. 15.

In the interpolation circuit as shown in FIG. 15, required for the first and second line memories 79 and 80 is capacity for storing the mainly interpolated image signals for one scanning line. On the other hand, the first and second line memories 79' and 80' of the interpolation circuit as shown in FIG. 19 are only required to store the image signals before interpolation for one scanning line, whereby the storage capacity is reduced to save the cost.

(M) Modifications of Second Embodiment

Although the above description has been made on such case where the ratios of input resolution to output resolution are equivalent (N=M=4) in the main and vertical scanning directions, these ratios may be different from each other. Further, the interpolation may be performed only in either the main or vertical scanning direction. For example, the outputs from the data selector 77 as shown in FIG. 15 may be employed for interpolation only in the main scanning direction while the outputs from the data selector 89 as shown in FIG. 19 may be employed for interpolation only in the vertical scanning direction.

Further, although the above embodiment has been described with respect to only one CCD, the present invention can be applied to a plurality of CCDs to further improve the input resolution thereof. In addition, the present invention is also applicable to processing of line originals, and in this case, input image signals may be processed in continuous tone by the present invention, to be subjected to binarization processing.

(N) Example of Design of Second Embodiment

An example of a concrete design of the second embodiment for the case where the input resolution is ¼ of the output resolution is as follows:

1. Input Main Scanning Resolution: about 14.8 lines/mm
2. Input Vertical Scanning Resolution: about 14.8 lines/mm
3. CCD Storage Time: 20 ms
4. Number of CCD Elements: 4384 in effective number (a CCD of 5000 elements)
5. Transfer Clock Frequency of CCD: about 880 KHz
6. Output Main Scanning Resolution: about 59.1 lines/mm
7. Output Vertical Scanning Resolution: about 59.1 lines/mm
8. Recording Time for One Scanning Line: 5 ms 9. Time for Processing an A4 Size Paper: about 1 min. (62 sec.)

The A-D conversion speed required with the said CCD transfer clock frequency of 880 KHz is less than about 1.13 μs, and hence an image scanning/recording apparatus for process can be manufactured by a commercialy available CCD of 5000 elements and an A-D converter of 12 bits in a conversion speed of about 1 μs.

When the CCD storage time is 20 ms (corresponding to $T_1, T_2, \ldots$ in FIG. 5) and the number of CCD elements is 4384, the data can be read within the storage time with a CCD transfer frequency of about 220 KHz, whereas the above embodiment requires a CCD transfer clock frequency of about 880 KHz since the data for one scanning line are read in a ¼ period of the storage time as shown at FIG. 16(b). When the storage time is to be matched with the read time to employ a lower transfer clock frequency, still another line memory may be provided for storaging image signals for one scanning line so that three line memories are circulated to sequentially store the input image signals line by line. Thus, interpolation in the vertical scanning line can be performed on the basis of image signals for two scanning lines inputted in advance during when image signals for a scanning line are inputted.

(O) Advantages of Second Embodiment

As hereinabove described, the input resolution is set lower than the output resolution to perform interpolation in at least one of the main and vertical scanning directions with respect to the input image signals obtained in the said low resolution according to the second embodiment, advantages of which are as follows:

First, images can be recorded in high resolution for process through use of a commercially available CCD having a small number of elements and an AD converter of about 12 bits which is relatively slow in conversion speed.

Second, an image scanning/recording apparatus of high resolution for process can be manufactured with a small number of components at a low cost.

Third, while adjustment of CCD locations and optical systems is difficult when a plurality of commercially available CCDs having a small number of elements for process are employed in connection, such adjustment can be completely omitted or reduced.

Fourth, image signals in rough input resolution are interpolated to smooth the picture quality. In other words, effectively prevented is such a state that continuous pixels identical in gradation to each other are unexpectedly followed by those different in gradation to provide abrupt gradation changes in the reproduced image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for interpolating image signals, comprising:
   memory means for storing data on at least two adjacent pixels of an input image;
   interpolation data generating means for interpolating between said two pixels to generate at least one interpolation data;
   timing control means for controlling output timings so that said image data on said two adjacent pixels and said generated interpolation data are outputted in a mode ordered in accordance with an array of pixels of an output image;
   a one-dimensional photoelectric conversion element array device for photoelectrically scanning an original, input resolution by said one-dimensional photoelectric conversion element array device being set to be lower than output resolution; and
   an A-D converter for converting input image signals from said one-dimensional photoelectric conversion element array device into digital image data, wherein
   said memory means includes a first memory means for storing a pair of image data adjacent in the main scanning direction and a second memory means for storing image data on a pair of scanning lines adjacent in the vertical scanning direction, and
   said interpolation data generating means includes a first interpolation data generating means for generating interpolation data for said image data stored in said first memory means and a second interpolation data generating means for generating interpolation data for said image data stored in said second memory means,
   said first memory means storing image data from said A-D converter and said second memory means storing said image data stored in said first memory means and said interpolation data generated by said first interpolation data generating means in compliance with said order by said timing control means.

2. An apparatus for interpolating image signals in accordance with claim 1, further comprising:
   clock generation means for generating second clocks by regularly defaulting clocks from an array of periodic first clocks on the basis of a prescribed rule in correspondence to a magnification for enlargement, and
   write/read means for storing said image data in said memory means on the basis of said first clocks while reading said image data in response to said second clocks.

3. An apparatus for interpolating image signals, comprising:
   memory means for storing data on at least two adjacent pixels of an input image;
   interpolation data generating means for interpolating between said two pixels to generate at least one interpolation data;
   timing control means for controlling output timings so that said image data on said two adjacent pixels and said generated interpolation data are outputted in a mode ordered in accordance with an array of pixels of an output image;
   a one-dimensional photoelectric conversion element array device for photoelectrically scanning an original, input resolution by said one-dimensional photoelectric conversion element array device being set to be lower than output resolution; and
   an A-D converter for converting input image signals from said one-dimensional photoelectric conversion element array device into digital image data, wherein
   said memory means includes a first memory means for storing a pair of image data adjacent in the main scanning direction and a second memory means for storing image data on a pair of scanning lines adjacent in the vertical scanning direction, and said interpolation data generating means includes a first interpolation data generating means for generating interpolation data for said image data stored in said first memory means and a second interpolation data generating means for generating interpolation data for said image data stored in said second memory means, said second memory means storing image data from said A-D converter, said first memory means storing said image data stored in said second memory means and said interpolation data generated by said second interpolation data generating means in compliance with said order by said timing control means.

4. An apparatus for interpolating image signals in accordance with claim 3, further comprising:

clock generation means for generating second clocks by regularly defaulting clocks from an array of periodic first clocks on the basis of a prescribed rule in correspondence to a magnification for enlargement, and write/read means for storing said image data in said memory means on the basis of said first clocks while reading said image data in response to said second clocks.

5. A method of interpolating image signals, comprising the steps of:

storing image data on at least two pixels of an input image adjacent in at least one of main and vertical scanning directions;

interpolating between said two pixels to generate at least one interpolation data;

ordering said image data on said two adjacent pixels and said generated interpolation data in accordance with an array of pixels of an output image;

photoelectrically scanning an original by a one-dimensional photoelectric conversion element array device to obtain input signals, input resolution by said one-dimensional photoelectric conversion element array device being set to be lower than output resolution thereof; and performing A-D conversion on said input image signals to obtain digital image data, wherein interpolation is performed with respect to one of main and vertical scanning directions to further perform interpolation on the other direction with respect to image data obtained as the result of said interpolation.

6. A method of interpolating image signals in accordance with claim 5, wherein ratios of output resolution to input resolution are independently set in respective ones of main and vertical scanning directions in integers, to perform interpolation in the main and vertical scanning directions on the basis of said ratios.

7. A method of interpolating image signals in accordance with claim 5, wherein ratios of charge storage times of said one-dimensional photoelectric conversion element array device to unit vertical scanning intervals of output image signals are equal to those of said output resolution to said input resolution.

8. An apparatus for interpolating image signals in an image processing unit for receiving image data of original pixels to store the same in image data memory means thereby to output said image data in a designated magnification, said apparatus comprising:

clock generating means for generating second clocks by regularly defaulting clocks from an array of periodic first clocks on the basis of a prescribed rule in compliance with said magnification;

read means for reading said image data stored in said image data memory means on the basis of said first clocks when said magnification is for enlargement, said reading being performed on the basis of said second clocks;

interpolation data generating means for interpolating said image data as read to generate at least one interpolation data; and interpolation data assigning means for selectively assigning said interpolation data to additional pixels added by said default of said clocks on the basis of selection data previously set in correspondence to said prescribed rule.

9. An apparatus for interpolating image signals in accordance with claim 8, wherein said clock generating means includes composite data memory means for collectively expressing data representing said prescribed rule and said selection data, said clock generating means and said interpolation data assigning means respectively performing processing on the basis of said composite data read from said composite data memory means.

10. An apparatus for interpolating image signals in accordance with claim 9, wherein said interpolation data generating means includes a plurality of linear interpolation arithmetic means for obtaining by arithmetic a plurality of linear interpolation data in response to positional relation between said additional pixels and said original pixels in said image data, said selection data corresponding to said positional relation between said additional pixels and said original pixels, said interpolation data assigning means including selection and assigning means for selecting one of said plurality of interpolation data in response to said selection data to assign the same to said additional pixels.

11. A method of interpolating image signals, comprising the steps of:

storing image data on at least two pixels of an input image adjacent in at least one of main and vertical scanning directions;

interpolating between said two pixels to generate at least one interpolation data;

ordering said image data on said two adjacent pixels and said generated interpolation data in accordance with an array of pixels of an output image;

photoelectrically scanning an original by a one-dimensional photoelectric conversion element array device to obtain input signals, input resolution by said one-dimensional photoelectric conversion element array device being set to be lower than output resolution thereof;

performing A-D conversion on said input image signals to obtain digital image data, wherein said storing step comprises a first storing step for storing a pair of first image data adjacent in a main scanning direction and a second storing step for storing second image data on a pair of scanning lines adjacent in a vertical scanning direction, and said interpolating step is performed with respect to said main and vertical scanning direction for generating first interpolation data for said first image data and for generating second interpolation data for said second image data.

12. A method of interpolating image signals as recited in claim 11 wherein said first storing step comprises storing A-D converted input image data and said second storing step comprises storing said image data stored in said first storing step and said first interpolation data in compliance with said ordering step.

13. A method of interpolating image signals as recited in claim 11 wherein said second storing step comprises storing A-D converted input image data and said first storing step comprises storing said image data stored in said second storing step and said second interpolation data in compliance with said ordering step.

* * * * *